(12) United States Patent
Bridge, Jr. et al.

(10) Patent No.: US 6,351,754 B1
(45) Date of Patent: Feb. 26, 2002

(54) METHOD AND SYSTEM FOR CONTROLLING RECOVERY DOWNTIME

(75) Inventors: William H. Bridge, Jr., Alameda; Boris Klots, Belmont; Juan R. Loaiza, San Carlos, all of CA (US); Ashok Joshi, Nashua, NH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/103,630

(22) Filed: Jun. 23, 1998

(51) Int. Cl.$^7$ .................................................. G06F 17/30
(52) U.S. Cl. ............................ 707/207; 714/16; 714/20
(58) Field of Search ............................ 707/202; 714/6, 714/15, 16, 20

(56) References Cited

U.S. PATENT DOCUMENTS

| | | | |
|---|---|---|---|
| 4,819,156 A | | 4/1989 | DeLorme et al. ............ 364/200 |
| 4,864,744 A | | 9/1989 | Reinsch et al. .......... 364/280.3 |
| 5,325,525 A | * | 6/1994 | Shan et al. .................. 709/104 |
| 5,819,083 A | * | 10/1998 | Chen et al. ..................... 707/10 |
| 5,864,849 A | | 1/1999 | Bohannon et al. ............. 707/8 |
| 5,933,593 A | * | 8/1999 | Arun et al. ...................... 714/6 |
| 5,951,658 A | * | 9/1999 | Daray, Jr. et al. ............. 710/56 |
| 6,044,475 A | | 3/2000 | Chung et al. ................. 714/15 |

FOREIGN PATENT DOCUMENTS

WO          WO 97/00477          1/1997

OTHER PUBLICATIONS

"Recovery Technique Based on Fuzzy Checkpoint in a Client/Server Database System," Choi et al., Proceedings of COMPSAC, 1996, IEEE (^CB35986 pp. 542–547) August, 1996.

"Checkpointing Schemes for fast Restart in Main Memory Database Systems," Lee et al., Proceedings of COMPSAC, 1996, IEEE 97CH36060, pp. 663–668, August, 1997.

* cited by examiner

*Primary Examiner*—Thomas Black
*Assistant Examiner*—John C. Loomis
(74) *Attorney, Agent, or Firm*—Hickman Palermo Truong and Becker LLP; Carl L. Brandt

(57) ABSTRACT

A method and system for reducing overhead associated with recovering after a failure. According to the method, a checkpoint value is maintained that indicates which records of a plurality of records have to be processed after the failure. The plurality of records contain change information that corresponds to a plurality of data blocks. A target checkpoint value is determined based on a desired number of data block reads that will be required during a redo phase of recovery. Changes contained in volatile memory are then written to nonvolatile memory to advance the checkpoint value to at least the target checkpoint value. According to another aspect of the invention, the target checkpoint value is determined using a circular queue of offset buckets. The offset buckets are used to store index values that are associated with buffers in the ordered list. The target checkpoint value is periodically set equal to an index value that is contained in an offset bucket. According to another aspect of the invention, the target checkpoint value is determined by calculating a maximum number of records that should be processed after the failure. The maximum number of records is based on the desired number of data block reads that will be required during the redo phase of the recovery. The target checkpoint value is updated based on the maximum number of records.

61 Claims, 9 Drawing Sheets

| | |
|---|---|
| 904 | 5000 |
| 906 | 4994 |
| 908 | 4988 |
| 910 | 4980 |
| | ⋮ |
| 912 | 3688 |
| 914 | 3682 |
| 916 | 3676 |
| 918 | 3672 |
| 920 | 3664 |
| 922 | 3658 |
| 924 | 3654 |
| | ⋮ |

REDO LOG FILE 902

Fig. 9

METHOD AND SYSTEM FOR CONTROLLING RECOVERY DOWNTIME

FIELD OF THE INVENTION

The present invention relates to computer systems and, more specifically, to a method for controlling downtime during the recovery of database systems.

BACKGROUND OF THE INVENTION

Most data processing systems include both volatile and nonvolatile memory devices. In general, volatile memory devices, such as random access memory, provide faster access times than nonvolatile memory devices, such as magnetic or optical disks. However, nonvolatile memory is generally less expensive and less susceptible to data loss.

To take advantage of the persistent nature of nonvolatile memory, an object, such as a data item in a database system, is typically stored on nonvolatile memory (i.e. database) until the object is required by a process. To take advantage of the speed of volatile memory, a copy of the object is loaded into volatile memory when the object is required by a process. Once the object is loaded into volatile memory, the process can quickly access and make changes to the copy of the object. At some later point in time, the copy of the updated object is written back to the database in order to reflect the changes that were made by the process.

For example, in a database system, a section of volatile memory known as a buffer cache is generally used by the processes for accessing and manipulating information contained within the database. In order for a process to access or change data that is stored in the database, a copy of the data is first loaded from the database into the buffer cache. After the data is loaded in the buffer cache, the process can then quickly access and manipulate the copied data version. At some later point in time, the contents of the buffer cache are written back to the database in order to reflect any changes that were previously made to the copied data version.

Typically, the buffer cache includes multiple buffers that are shared among one or more processes that are executing on a database server. When a process executes a transaction that requires a change to an item within a data block, a copy of the data item is loaded into a buffer in the buffer cache. Any changes are then made to the data within the buffer.

Because of the nature of volatile memory, various types of failures can cause the information contained within the buffers to be lost. If the volatile memory contains updated copies of data items, the changes may be lost if a failure occurs before the changes are written back into the database. In many applications, such loss of information is unacceptable.

Therefore, recovery techniques have been developed to reduce the possible loss of information due to failures within a database system. According to one approach, data is made "recoverable" whenever it becomes critical for the data to survive a failure. Data is considered to be "recoverable" when enough information to reconstruct the data after a failure is stored in nonvolatile memory. For example, in database systems it is considered critical that the changes made by a particular committed transaction be reflected within the database and the changes made by a particular aborted transaction be removed from the database.

Redo Records

One method of making the updated data recoverable is to write redo records into a redo log file in nonvolatile memory. The redo records contain a description of the changes that were made by a particular transaction ("change information") that will enable a recovery process to reapply the changes in the event of a failure.

Specifically, whenever a transaction executes, space is allocated for redo records in both volatile and nonvolatile memory. The redo records are used to store change information about updates that a transaction makes to a particular buffer in the buffer cache. The change information is stored in the redo records in volatile memory and then later copied to nonvolatile memory.

In creating the redo records, a version identifier is associated with each redo record. The version identifier indicates the version of a particular data item associated with the update information contained in a redo record. After the redo record is copied into the redo log file, the version identifier is used in determining whether the data item in the database reflects the changes recorded in the redo record. In addition to the version identifier, each redo record in nonvolatile memory is associated with a byte offset that indicates where the particular redo record is located within the redo log file.

For example, FIG. 1 illustrates a redo-based recovery mechanism that can be used to perform changes that are recorded in a redo log file 118 in the event of a failure in the database system. As depicted in FIG. 1, database 128 and redo log file 118 reside within the nonvolatile memory 101 of database system 100. Conversely, buffer cache 102 and redo log buffer 112 reside within the volatile memory 103 of database system 100. Buffer cache 102 contains buffers 104, 106, 108, and 110 which respectively contain data loaded into volatile memory 103 from data items 142, 134, 130 and 138 within database 128. For the purposes of explanation, it shall be assumed that data items 142, 134, 130 and 108 are respectively data blocks A, B, C and D from the database 128.

Contained within redo log buffer 112 are redo records 114 and 116 which describe the changes made to data item 108 by a transaction (TX3). By the time transaction TX3 commits, the information that is contained in redo records 114 and 116 is stored in redo log file 118 as redo records 124 and 120 respectively. The version identifier associated with each redo record is copied into the redo log file and is used in determining whether the associated data item in the database reflects the changes that are recorded in the particular redo record.

Performing Recovery With Redo Records

If a database failure occurs, all information contained in volatile memory 103 may be lost. Such information may include buffers within buffer cache 102 that contain data items that have been updated by transactions, but that had not yet been saved to non-volatile memory 101. As mentioned above, it is essential for the committed updates made by all such transactions to be reflected in the persistently-stored data items within the database 128.

To ensure that updates made by transactions are reflected in the database 128 after a failure, redo records in the redo log file 118 are sequentially processed after a failure. A redo record is processed by reading the redo record from the redo log file 118 and then retrieving the data item identified in the redo record. The process performing the recovery (the "recovery process") then determines if the change specified in the redo record is already reflected in the copy of the data item that is stored in the database 128. If the change is not reflected in the data item, then the change is applied to the data item. Otherwise, the change is not applied to the data item and the next redo record in the redo log file 118 is processed.

In a conventional redo-based approach to recovery, the recovery process determines whether the change identified in a redo record has already been applied to a data item by reading a version identifier from the data item and comparing the version identifier from the data item to the version identifier stored in the redo record. In a typical database system, determining whether a change identified in a particular redo record has already been applied to a data item requires the overhead of reading a data block that contains the data item into volatile memory and then comparing the version identifier associated with the data item to the version identifier stored in the redo record. If the version identifier stored in the redo record is newer than the version identifier associated with the data item, then the buffer that contained the updated data item had not been written from the buffer cache 102 back to the database 128 prior to the failure. Therefore, the change must be applied to the on-disk copy of the data item that is stored in the database 128. On the other hand, if the version identifier associated with the data item is at least as recent as the version identifier stored in the redo record, then the change does not need to be reapplied.

For example, assume that a failure occurs and all of the information stored in volatile memory 103 is lost. To determine whether the change in redo record 124 has already been applied to data item 130, data block C must first be read into volatile memory to obtain the data item 130 and version identifier 132. The version identifier 132 ("99") is then compared with the version identifier associated with redo record 124 ("100"). If the version identifier associated with redo record 124 is newer than the version identifier 132 of data item 130, then the changes associated with redo record 124 had not been written back into data item 130 in data block C prior to the failure. On the other hand, if version identifier 132 of data item 130 data block C is at least as recent as the version identifier associated with redo record 124, then the changes associated with redo record 124 had been written back into data item 130 in data block C prior to the failure.

Although the redo log file 118 provides for the recovery of changes made by transactions that have not been applied to the database prior to a failure, it is inefficient to process all of the redo records of redo log file 118 when a high percentage of those records are for changes that have already been stored in the database 128. In addition, because the redo log file is continually growing, a recovery operation can become quite time consuming.

For example, in FIG. 1, upon a failure in database system 100, data item 142 and redo record 156 must be read into volatile memory 103 in order to compare version identifier 144 with the version identifier associated with redo record 156. The process of reading data item 142 and redo record 156 into memory creates unnecessary overhead, since version identifier 144 is newer than (i.e. greater than) the version identifier associated with redo record 156, and therefore the change recorded in redo record 156 is already reflected in database 128.

Checkpoints

In order to reduce the number of data blocks and redo records that are unnecessarily read into memory during a recovery operation, a checkpoint operation may be periodically executed. During a checkpoint operation, all "dirty" buffers that are currently stored in the buffer cache 102 are written into the database 128. A "dirty" buffer is defined as a buffer in the buffer cache 102 that contains data that has been modified by a transaction but has not yet been written back to the database 128. After a checkpoint operation is performed, all changes identified in redo records that were contained in the redo log file 118 prior to when the checkpoint operation was initiated will be reflected in the database 128. Therefore, those records will not have to be processed after a failure.

To indicate which redo records in the redo log file 118 do not have to be processed after a failure, a "checkpoint value" is stored in nonvolatile memory 101. The checkpoint value indicates the boundary within redo log file 118 between redo records that must be processed after a failure and redo records that do not have to be processed after a failure. The checkpoint value may be, for example, a byte offset from the beginning of the redo log file 118, where all redo records that are stored in the redo log file before the location identified by the checkpoint value are guaranteed to be reflected in the database.

For example, as illustrated in FIG. 1, in executing the checkpoint operation on database system 100, a checkpoint process begins by storing a byte offset (i.e. the end of redo record 120) which represents where the next redo record is to be allocated in redo log file 118. The checkpoint process then marks as needing checkpointing all buffers in buffer cache 102 that contain changes since being loaded from database 128. After marking the appropriate buffers, the checkpoint process then writes the marked buffers within buffer cache 102 back to the database 128. After the dirty buffers are successfully written back to the database, the checkpoint 158 is set equal to the previously stored byte offset (i.e. end of redo record 120). Redo record 160 represents the beginning of the redo records that were stored in the redo log file 118 after the checkpoint operation began.

In the event of a subsequent failure, the recovery process can begin processing with redo record 160 (i.e. the record that follows checkpoint 158). The redo records that precede the checkpoint 158 (i.e. redo records 120, 124, 148, 152 and 156) may be ignored because the changes reflected therein have previously been written to database 128.

Because redo log files can potentially contain an extremely large number of redo records, performing checkpoint operations on the redo log file 118 can significantly reduce recovery time as the recovery process is no longer required to begin the recovery phase with the first redo record in the redo log file 118. Instead, the recovery process can begin the recovery phase at the latest checkpoint value. Thus, if a database system failure occurs, only those data blocks for which redo records were generated in the redo log file 118 after the checkpoint operation began will be required to be read into memory during recovery.

Because a checkpoint operation is commonly performed on a periodic basis, a "latency period" typically exists between the time a checkpoint operation completes and the next checkpoint operation begins. During this latency period, a significant number of redo records will typically be written into the redo log 118 after the checkpoint value. These redo records correspond to changes that were made to "new" dirty buffers that were read in from data blocks in database 128 and modified after the checkpoint operation completed. Thus, if a database system failure occurs, to process the significant number redo records, a large number of data blocks will typically be required to be read during recovery. Therefore, even using a checkpoint process to reduce recovery time, there is no guarantee or limit to the actual number of data blocks that will need to be accessed after a database system failure. Also, if a failure occurs prior to the completion of the checkpoint process, the previously stored checkpoint value must be used which will require an even greater number of data blocks to be read from database 128 during recovery.

In addition, because the buffer cache 102 can contain a large number of dirty buffers, in certain systems, a significant amount of time can elapse between when the checkpoint operation begins and when the checkpoint operation completes. Therefore, by the time a checkpoint operation completes, a large number of redo records may have been written into the redo log 118 after the checkpoint value. Again, these redo records correspond to changes that were made to "new" dirty buffers that were read in from data blocks in database 128 and modified after the checkpoint operation began.

In certain cases, requiring a large number of data blocks to be accessed during recovery can result in unacceptably long downtimes. In addition, because the number of data blocks that need to be accessed during recovery can significantly vary, it is difficult, if not impossible, for a database administrator to predict the amount of downtime that will be required to recover after a database failure.

Therefore, based on the foregoing, it is highly desirable to provide a mechanism which can control the amount of downtime that is the result of a database failure.

SUMMARY OF THE INVENTION

A method and system for reducing overhead associated with recovering after a failure. According to the method, a checkpoint value is maintained that indicates which records of a plurality of records have to be processed after the failure. The plurality of records contain change information that corresponds to a plurality of data blocks. A target checkpoint value is determined based on a desired number of data block reads that will be required during a redo phase of recovery. Changes contained in volatile memory are then written to nonvolatile memory to advance the checkpoint value to at least the target checkpoint value.

According to another aspect of the invention, the record associated with the checkpoint value is identified. If a particular record is determined to have been stored in nonvolatile memory before the record associated with the checkpoint value, then the particular record is not processed. However, if it is determined that the particular record was not stored to nonvolatile memory before the record associated with the checkpoint value, then the particular record is processed.

According to another aspect of the invention, the target checkpoint value is determined using a circular queue of offset buckets. The offset buckets are used to store index values that are associated with buffers in the ordered list. The target checkpoint value is periodically set equal to an index value that is contained in an offset bucket.

According to another aspect of the invention, the target checkpoint value is determined by calculating a maximum number of records that should be processed after the failure. The maximum number of records is based on the desired number of data block reads that will be required during the redo phase of the recovery. The target checkpoint value is updated based on the maximum number of records.

According to another aspect of the invention, to advance the checkpoint value all buffers from a plurality of ordered lists that have an index value which are less than the target checkpoint value are removed. The index value that is associated with a smallest index value of all buffers located at the head of the one of the plurality of ordered lists is then written to nonvolatile memory as the checkpoint value.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 illustrates a redo log file containing a plurality of records and a next record for demonstrating how a target checkpoint value can be determined using a running average according to an embodiment of the invention.

DETAILED DESCRIPTION OF THE PREFERRED EMBODIMENT

A method and apparatus for controlling the amount of recovery downtime after a database system failure is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 2:
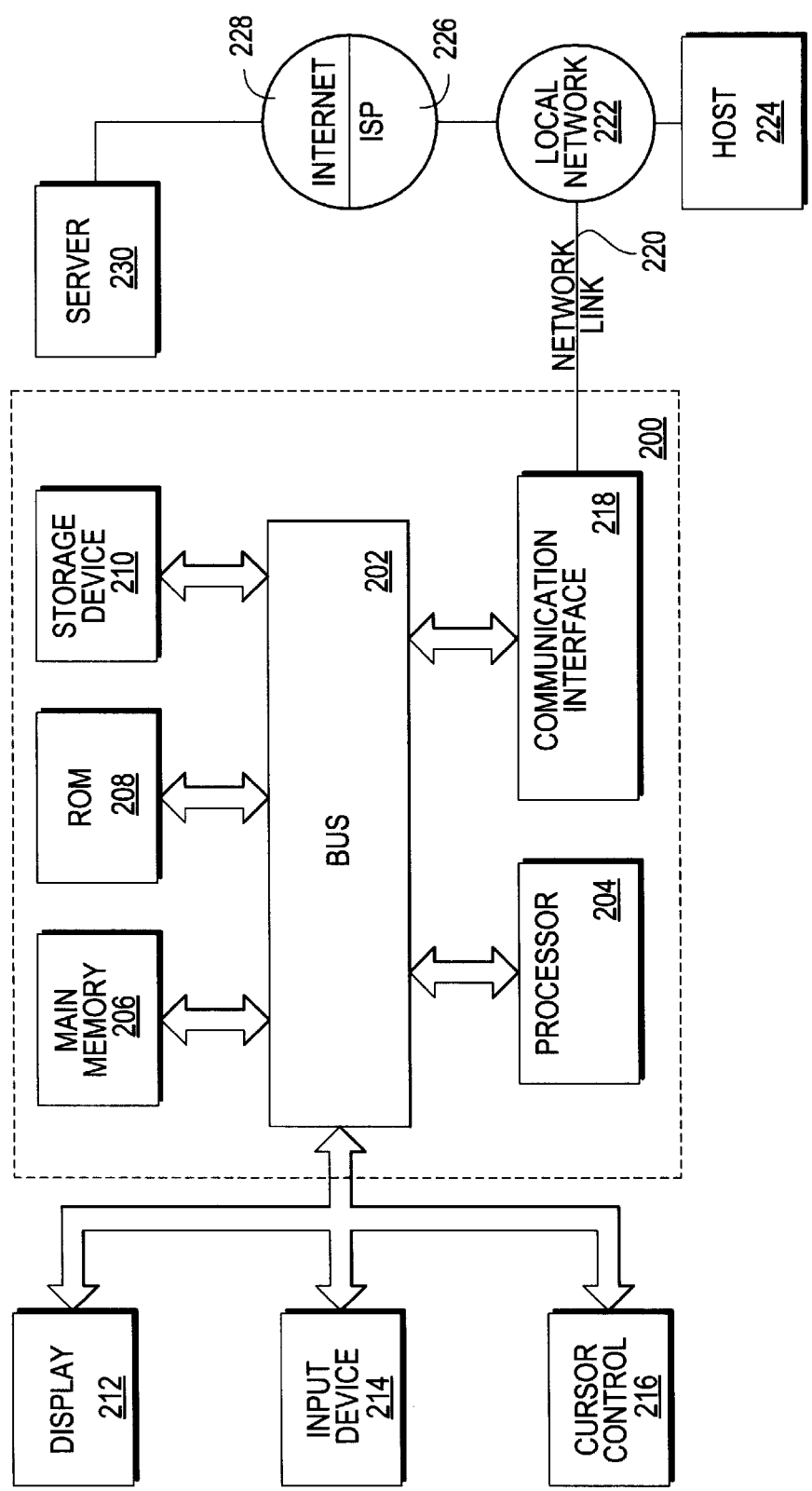
FIG. 2 is a block diagram illustrating a computer system on which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for controlling the amount of recovery downtime after a database system failure. According to one embodiment of the invention, controlling the amount of recovery downtime is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for controlling the amount of recovery downtime after a database system failure as described herein.

The received code may be executed by processor 204 as it is received, and/or stored in storage device 210, or other non-volatile storage for later execution. In this manner, computer system 200 may obtain application code in the form of a carrier wave.

Overview

The present invention provides a mechanism for controlling the amount of time that is needed to recover after the occurrence of a database system failure ("recovery downtime"). As previously stated, recovery time is strongly influenced by the number of data blocks that are required to be read into volatile memory after a database system failure. Recovery downtime is controlled by maintaining a checkpoint value that limits the number of data blocks that are required to be read in from the database in the event of a database system failure.

In certain embodiments, the checkpoint is maintained by repeatedly advancing the checkpoint to a new target checkpoint value. The checkpoint is advanced by writing to disk all updated blocks that have redo records below the target checkpoint value. In certain embodiments, the selected target checkpoint value corresponds to a byte offset in the redo log file above which reside redo records for only a limited number of data blocks. Only those data blocks associated with redo records above the target checkpoint value will need to be processed in the event of a database failure. A variety of techniques may be used to select target checkpoint values. Several of these methods are described in detail below.

In certain embodiments, a sorted buffer queue is used to repeatedly advance the current checkpoint based on the selected target checkpoint value. In one embodiment, a sorted buffer queue that contains updated buffers as queue entries is maintained in volatile memory. An index value is associated with each queue entry. The index value for an entry indicates where a corresponding redo record is stored in nonvolatile memory (i.e. within the redo log file 118). The index value associated with each queue entry is used to sort the queue entry into the tail of the sorted buffer queue. The process of inserting buffers into the sorted buffer queue is described below.

In certain embodiments, to advance the checkpoint value, the queue entries that are associated with index values that are less than the target checkpoint value are written back to the database and removed from the sorted buffer queue. In one embodiments, the checkpoint value is advanced by repetitively removing the queue entries that are at the head of the sorted buffer queue which are associated with index values that are less than the target checkpoint value. However, before a queue entry can be removed from the sorted buffer queue, the changes associated with the queue entry must first be written back to the database. Therefore, before a queue entry is removed, the changes associated with the queue entry are first written back to the database.

By repeatedly advancing the checkpoint based on a selected target checkpoint value, the number of data blocks that need to be read into volatile memory after a database system failure can be limited, thus, controlling the amount of recovery downtime during a database system failure.

In certain embodiments, the index value that is associated with the queue entry that is currently at the head of the sorted buffer queue is periodically stored as the current checkpoint value. Thus, as queue entries are removed from the head of the sorted buffer queue, the checkpoint value is continually incremented. The incrementing of the checkpoint value on a continual basis is described in detail below.

Inserting Buffers Into a Sorted Buffer Queue

Figure 1:
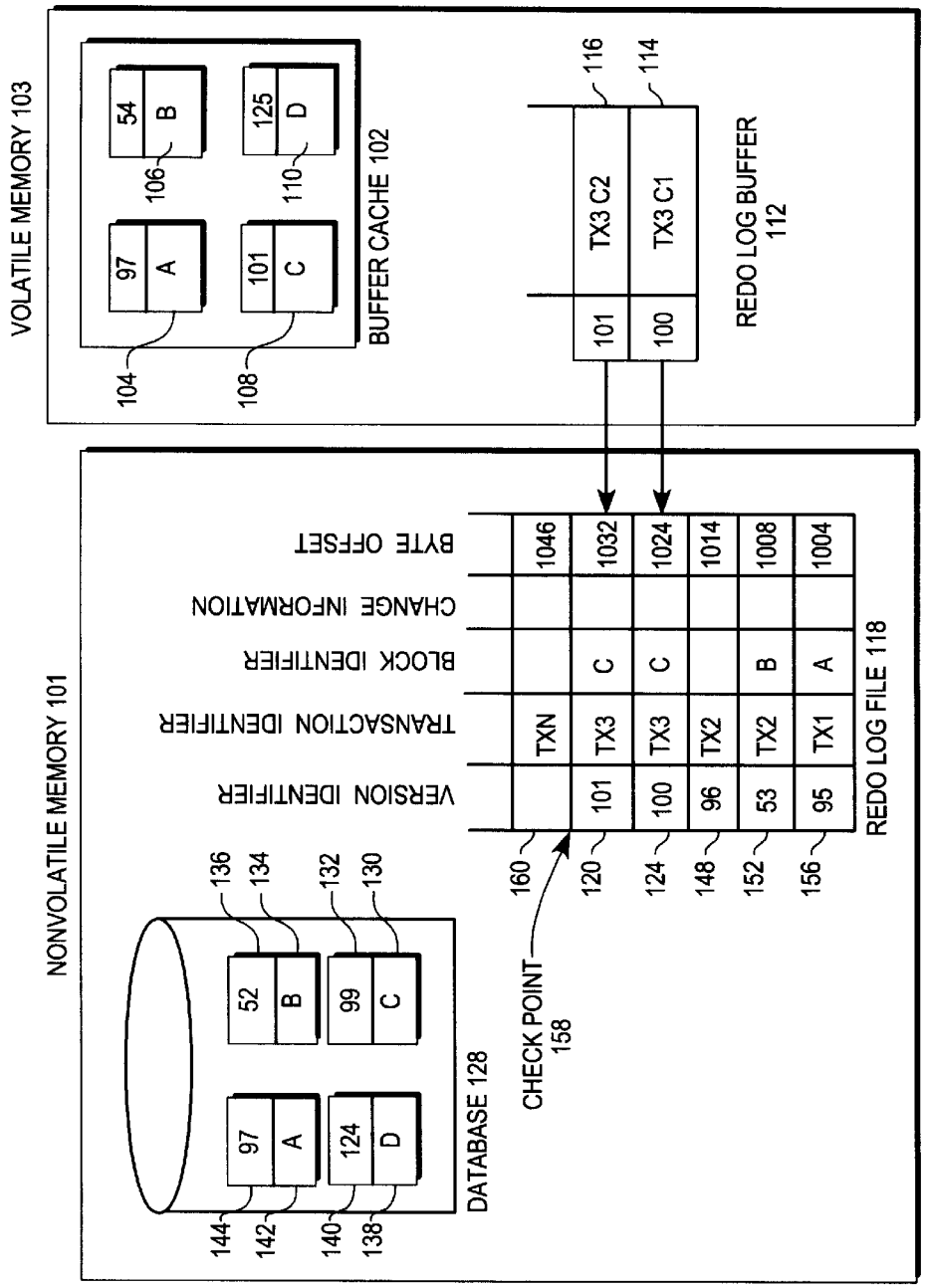
FIG. 1 is a block diagram that illustrates a recovery system that supports a conventional checkpointing procedure in a typical database system.
Figure 3:
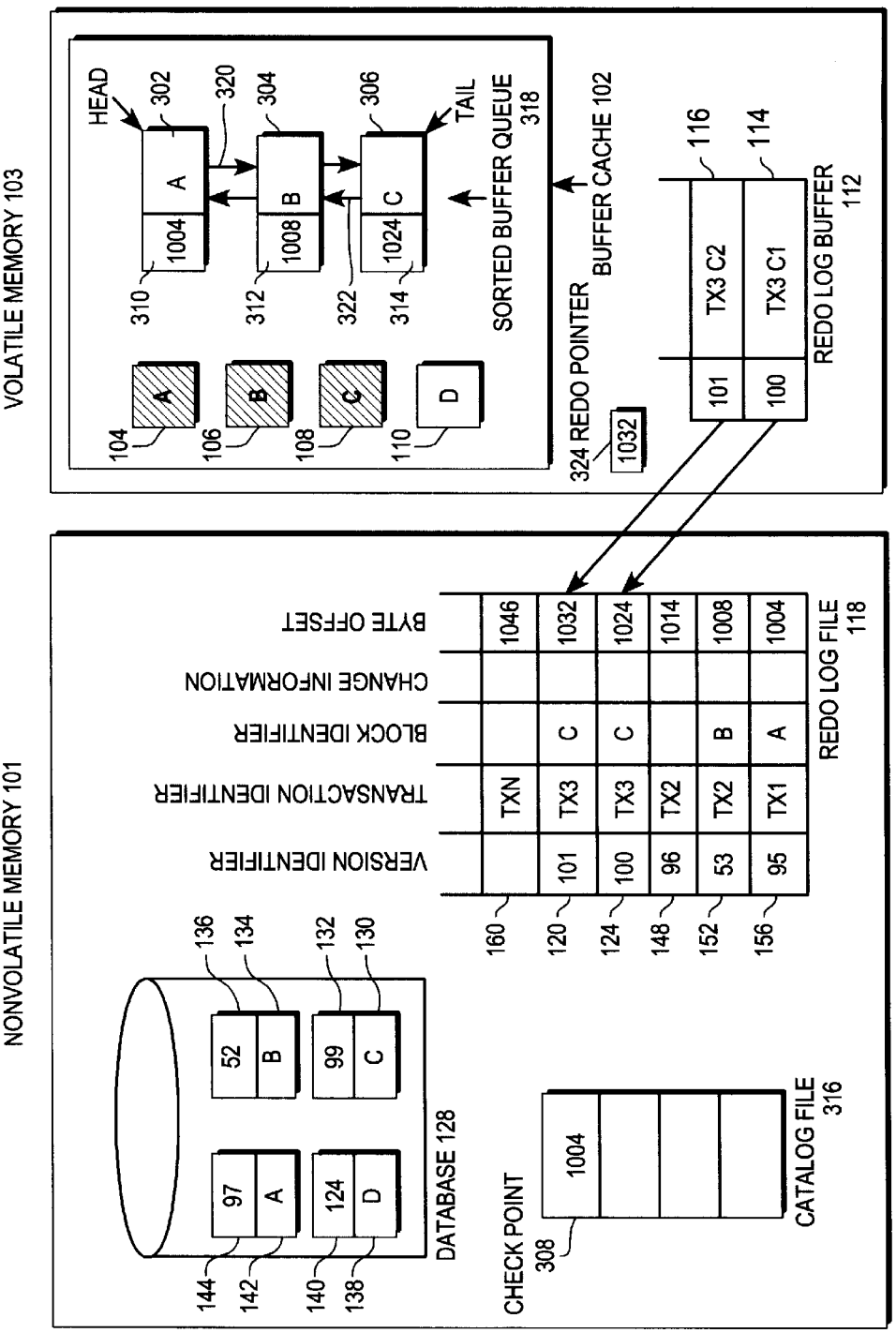
FIG. 3 is a block diagram illustrating one embodiment in which a single sorted queue is used to incrementally increase the checkpoint value.

As previously indicated, in certain embodiments, a sorted buffer queue is used to advance the checkpoint. FIG. 3 is a block diagram depicting an embodiment of the present invention in which a sorted buffer queue is used to advance the checkpoint value in a database system. As many of the components in FIG. 3 are similar to those in FIG. 1, like components have been assigned like reference numbers.

As depicted in FIG. 3, buffer cache 102 contains buffers 104, 106, 108 and 110 which have been previously loaded with data items from database 128. Whenever a transaction attempts to update a buffer in buffer cache 102, a redo record to store information about the update is allocated in redo log buffer 112. When allocating space for the redo record in the redo log buffer 112, the redo record is initially marked invalid. In addition to allocating space in redo log buffer 112, space for storing the redo record is also allocated in redo log file 118. A byte offset in redo log file 118 indicates the start of the redo record within redo log file 118 into which the redo information will eventually be written.

After the redo record in redo log buffer 112 is marked invalid, the change information is copied into the redo record within redo log buffer 112. Next, using the byte offset of the associated redo record in redo log file 118, the buffer is sorted into the tail of sorted buffer queue 318 and becomes a queue entry. Each sorted buffer queue contains a latch that allows only one queue entry to be sorted into the sorted buffer queue at a time. After the buffer becomes a queue entry, the associated redo record in redo log buffer 112 is mark valid. If a failure occurs before the associated redo record in redo log buffer 112 is marked valid, the change information is considered invalid and therefore not to exist.

After the redo record in redo log buffer 112 is marked valid, the change information is copied into the appropriate redo record within redo log file 118. The location of the redo record within redo log file 118 is stored in volatile memory as redo pointer 324 and indicates the position of the last redo record which was written into redo log file 118. The buffer may actually be updated to reflect the changes described in the redo record either before or after the changes are copied into the redo record within redo log file 118.

Buffers 104, 106 and 108 represent buffers that have been updated since being loaded from database 128 and are respectively depicted as queue entries 302, 304 and 306 in sorted buffer queue 318. FIG. 3 depicts two copies of buffers A, B, and C in the buffer cache 102; one copy belonging to the sorted buffer queue 318 and another copy separate from the sorted buffer queue 318. However, there is preferably only one copy of each buffer maintained, and the copy may belong to any number of queues in addition to the sorted buffer queue 318.

Checkpoint 308 represents the current checkpoint value. In the illustrated embodiment, the checkpoint 308 is in the form of a byte offset of a particular redo log record within the redo log file 118. As shown here, checkpoint 308 is contained within a catalog file 316 and is currently set equal to byte offset 1004, which represents the beginning of redo log record 156. By maintaining a separate section within the catalog file for storing separate checkpoint values for each database server accessing database 128, a reduction in access contention between multiple database servers within a database system can be achieved.

As stated above, sorted buffer queue 318 currently contains queue entries 302, 304 and 306. Each queue entry contains an index value that was used to sort the queue entries into the tail of buffer queue 318. The index value of each queue entry equals the byte offset value in redo log file 118 of the first redo log record that describes changes to the block in the queue entry. Consequently, the order of the entries in the buffer queue 318 reflect the order of the corresponding redo records in redo log file 118. In an alternative embodiment of the present invention, the index value corresponds to a counter value that indicates when the associated redo record in redo log file 118 was allocated.

Figure 4:
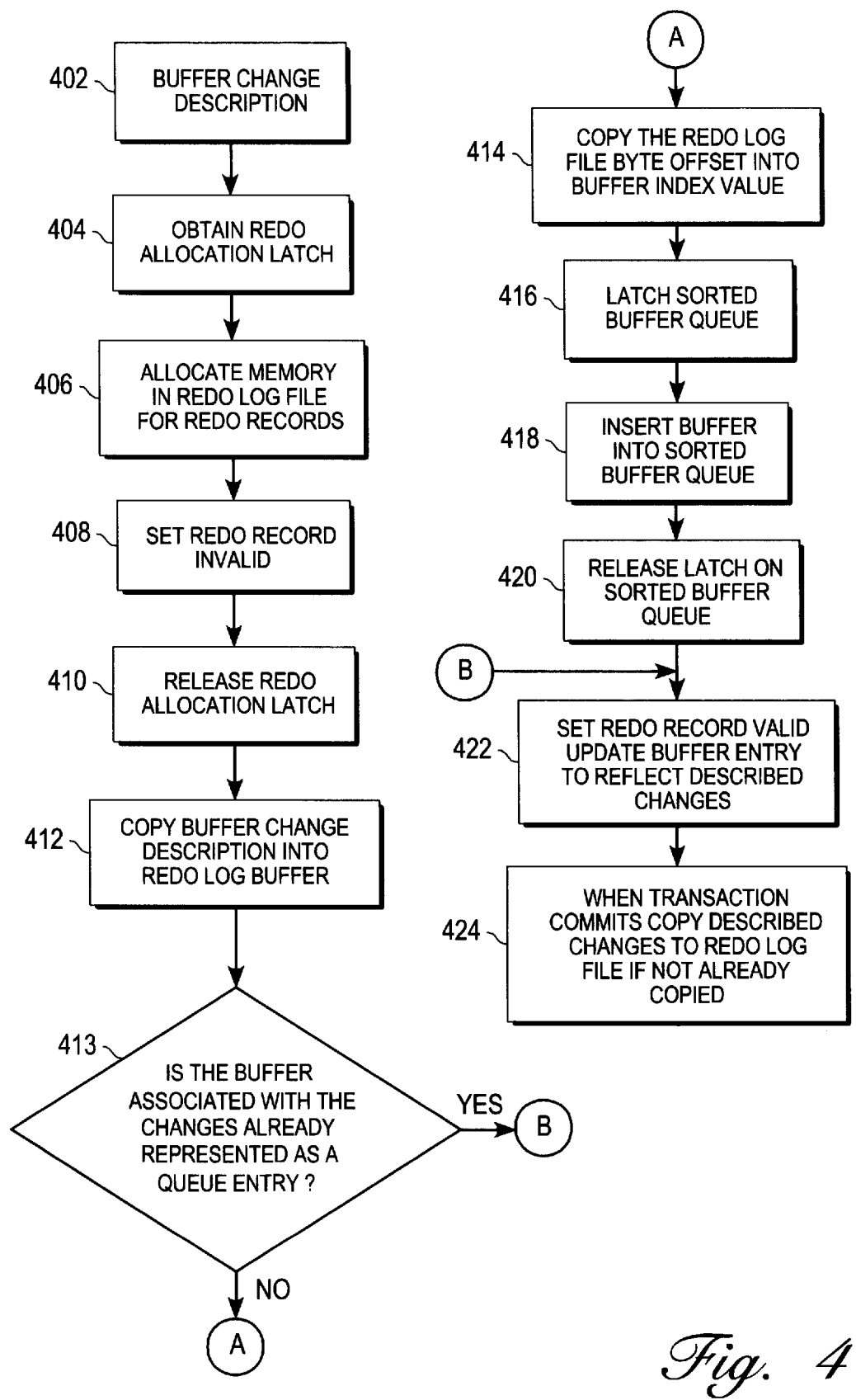
FIG. 4 is a flow diagrams illustrating steps for incrementally increasing the checkpoint value using a single sorted queue.

For example, FIG. 4 is a flow diagram that illustrates the steps of inserting queue entries into a sorted buffer queue according to certain embodiments of the present invention. At step 402, a description of changes to buffer 108, caused by transaction TX3_C1 are maintained in volatile memory 103.

At step 404, a latch is obtained for redo log buffer 112 and redo log file 118 to limit access by other processes. At step 406, space is allocated in redo log buffer 112 and redo log file 118 for storing the TX3_C1 change description in redo records 114 and 124. At step 408, redo record 114 is marked invalid to indicate that the information contained within the redo record 114 is not currently valid.

At step 410, the latch on redo log buffer 112 and redo log file 118 is released to allow other processes access to redo log buffer 112 and redo log file 118. At step 412, the change information for buffer 108 is copied into redo record 114 in redo log buffer 112.

At step 413, the buffer 108 to which the changes are to be made is examined to determine if it is currently represented as a queue entry in the sorted buffer queue 318. If the buffer 108 to which the changes are to be made is currently represented as a queue entry in the sorted buffer queue 318, then control passes to step 422. Otherwise, if the buffer 108 associated with the changes is not currently represented as a queue entry in the sorted buffer queue 318 then at step 414, the byte offset value associated with redo record 124 is copied into the index field 314 associated with buffer 108.

At step 416, a latch is obtained in order to restrict access to sorted buffer queue 318 by other processes. At step 418, buffer 108 is sorted into the tail of sorted buffer queue 318 as queue entry 306 using index value 314. Because the index value 314 (which, in the illustrated example, is 1024) is greater than or equal to the index value 312 associated with queue entry 304 (which is 1008), queue entry 306 is inserted into sorted buffer queue 318 following queue entry 304. However, if the index value 314 was less than the index value 312, queue entry 306 would have been inserted into sorted buffer queue 318 ahead of queue entry 304. A buffer is considered "first dirtied" whenever it is inserted into the sorted buffer queue. In certain embodiments, a dirty buffer counter, which is used to count the number of first dirties, is incremented whenever a buffer is inserted into the buffer queue.

At step 420, the latch on sorted buffer queue 318 is released to allow other processes to insert entries into the sorted buffer queue 318. At step 422, the buffer C associated with queue entry 306 is updated to reflect the changes described in redo record 114. At step 424, redo record 114 in redo log buffer 112 is copied into redo record 124 of redo log file 118. The operation of copying redo record 114 into redo log buffer 112 may occur at any time before the transaction (TX3) that made the change reflected in the redo record 114 commits.

As depicted in FIG. 3, each buffer is associated with no more than one queue entry in sorted buffer queue 318 at any given time. Therefore, when a second update is performed on a buffer (either by the same transaction of a different transaction than the transaction that performed the first update) that is already represented as a queue entry in sorted buffer queue 318, a new queue entry is not inserted into the sorted buffer queue 318. Instead, the buffer associated with the queue entry is updated to reflect the second update while maintaining its position in the sorted buffer queue 318. In addition, the index value associated with the queue entry is not updated to reflect the byte offset in the redo log file 118 of the new redo record generated for the second update.

For example, referring to FIG. 4, if at step 413 a queue entry 306 associated with buffer C is already contained within sorted buffer queue 318, then the byte offset associated with redo record 120 in redo log file 118 is not stored as index value 314. Instead, control passes to step 422, where buffer C associated with queue entry 306 is updated to reflect the changes described in redo record 116 while maintaining its current position.

In the description given above, space for a redo record is allocated in redo log file 118 before the buffer associated with the redo record is added to sorted buffer queue 318. This allows the byte offset of the allocated space to be used as the index value used to sort the buffer into the sorted buffer queue 318. However, in an alternative embodiment, buffers can be added to the sorted buffer queue 318 before allocating space in the redo log file 118 for the redo record for the update to the buffer.

In an embodiment that adds a buffer to the sorted buffer queue 318 before allocating space in the redo log file for the redo record for the update to the buffer, the buffer is added to the tail of the sorted buffer queue 318. After the buffer is added to the sorted buffer queue, space for the corresponding redo record is allocated, and the byte offset of the allocated space is stored in the queue entry associated with the buffer. For the order of the sorted buffer queue to be accurate, later-added buffer entries must be assigned higher byte offset values. Therefore, precautions have to be taken to ensure that space is allocated for the redo record of a buffer before space is allocated for redo records of buffers associated with subsequently added queue entries. This may be accomplished, for example, by holding the latch associated with the sorted buffer queue 318 until space is allocated in the redo log file 118, thereby preventing additional entries to be placed on the sorted buffer queue 318 until space is allocated. Alternatively, a separate process may assume the responsibility for allocating space in the redo log file 118 for the redo records associated with the buffers in the sorted buffer queue 318. The process would allocate space for the redo records based on the order in which buffers are stored in the sorted buffer queue 318, thus ensuring that index entries in the queue that follow a particular entry will be assigned higher index values than the particular entry.

Inserting Buffers Into Multiple Sorted Buffer Queues

Figure 5:
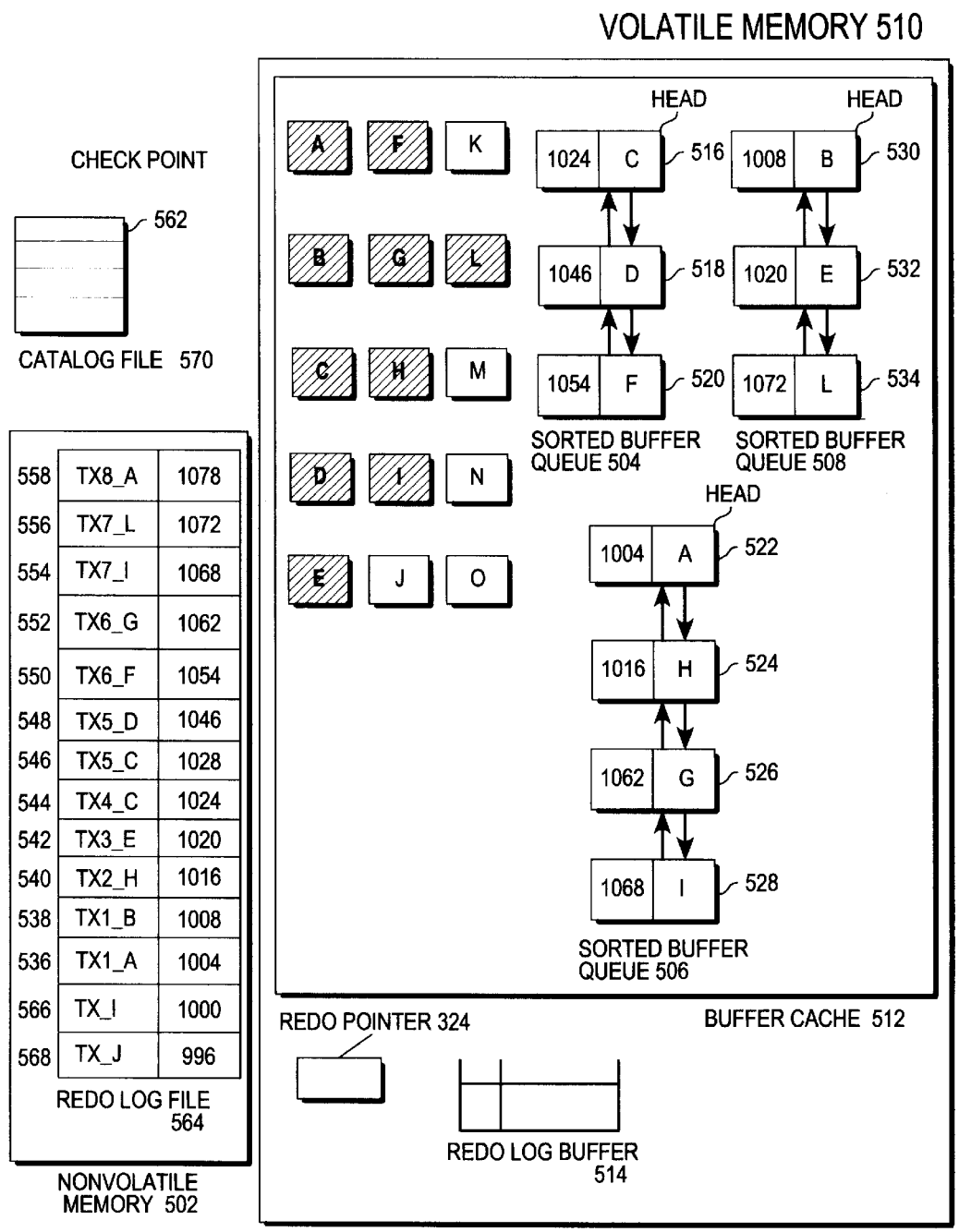
FIG. 5 is a block diagram illustrating one embodiment in which multiple sorted queues are used to incrementally increase the checkpoint value.

Although FIG. 3 depicts a single sorted buffer queue, in certain embodiments, multiple sorted buffer queues are used to increase the concurrency of the database system. FIG. 5 depicts an alternative embodiment in which multiple sorted queues are used to advance the checkpoint value in a database system.

As depicted in FIG. 5, by using multiple sorted buffer queues, concurrent processing within the database can be increased as sorted queues are more readily available for each process. By increasing the number of sorted queues, a process is less likely to have to wait to obtain a latch in order to insert a queue entry into a sorted buffer queue.

In one embodiment, a sorted buffer queue is maintained and associated for each least recently used (LRU) list within the database server. The LRU lists contain buffers within buffer cache 512 that are ordered within the LRU lists by when they were last accessed.

In using multiple sorted buffer queues, several techniques can be used to select which sorted buffer queue a particular queue entry will be sorted into. However, once the sorted buffer queue is chosen, the steps required for inserting the particular queue entry into the sorted buffer queue are the same as previously described above for inserting queue entries in a single sorted buffer queue.

Storing the Checkpoint Value Using a Single Buffer Queue

When the buffer associated with a queue entry is written to disk, the queue entry is removed from the sorted buffer queue 218. When the head of the queue is removed from the queue, the queue entry moves to the head of sorted buffer queue 318. By periodically writing the index value associated with the queue entry located at the head of sorted buffer queue 318 into checkpoint 308, the checkpoint value is advanced. In one embodiment of the present invention, the index value associated with the queue entry located at the head of the sorted buffer queue 318 is stored in checkpoint 308 on a periodic basis. For example, using a timer, a process can be scheduled to store the index value associated with the queue entry located at the head of sorted buffer queue 318 into checkpoint 308 every three seconds.

In an alternative embodiment, the index value associated with the queue entry located at the head of the sorted buffer queue 318 is stored in checkpoint 308 whenever the process that is assigned the task of storing the checkpoint value is scheduled to execute.

It should be noted that the checkpoint value must never exceed the position of the last redo record that was written into redo log file 118. Therefore, before the value of the queue entry located at the head of sorted buffer queue 318 can be written into checkpoint 308 it must first be compared with the value of redo pointer 324. If the value of the queue entry located at the head of sorted buffer queue 318 is less than or equal to the value of redo pointer 324, the value of the queue entry is written into checkpoint 308. In certain embodiments of the invention, if the value of the queue entry located at the head of sorted buffer queue 318 is greater than the value of redo pointer 324, the value redo pointer 324 is written into checkpoint 308.

For example, referring back to FIG. 3, the checkpoint value is advanced when the index value 310 associated with queue entry 302 is stored as the value of checkpoint 308. Because the queue entries are maintained in a sorted order within sorted buffer queue 318, all entries in redo log file 118 prior to redo record 156 (i.e. all records below byte offset 1004) are guaranteed to be reflected on database 128. Therefore, each time a new queue entry is moved to the head of sorted buffer queue 318 and the associated index value is written into checkpoint 308, the checkpoint value is advanced. By maintaining a separate checkpoint sector in catalog file 316 for each database server that has access to database 128 (each of which will have its own redo log file), concurrency of the database system is increased as multiple database servers can update their checkpoint values concurrently.

In certain situations, sorted buffer queue 318 may become empty and therefore not contain any queue entries. When this occurs, the value of redo pointer 324 is stored in checkpoint 308 as the current checkpoint value.

Storing Checkpoint Values Using Multiple Buffer Queues

When multiple sorted buffer queues are used, an index value associated with a queue entry at the head of one of the sorted buffer queues is selected for updating the checkpoint value. In one embodiment of the invention, the index values that are associated with the queue entries at the head of each sorted buffer queue are compared, and the minimum index value is used as the checkpoint value. By selecting the index entry with the smallest value, all entries previously written in the redo log file are guaranteed to be reflected on the database.

For example, referring to FIG. 5, queue entries 516, 522 and 530 are currently located at the head of sorted buffer queues 504, 506 and 508 respectively. As depicted in FIG. 5, the index value associated with queue entry 522, currently contains the smallest value. By selecting and storing in checkpoint 562, the index value associated with queue entry 522, the checkpoint value can be advanced to a valid value as all redo records in redo log file 564 prior to redo record 536 (e.g. byte offset 1004), are guaranteed to be reflected in nonvolatile memory 502.

As stated above, it should be noted that the checkpoint value must never exceed the position of the last redo record that was written into redo log file 564. Therefore, before the value of the queue entry associated with the smallest value can be written into checkpoint 562 it must first be compared with the value of redo pointer 324. If the queue entry associated with the smallest value is less than or equal to the value of redo pointer 324, the queue entry associated with the smallest value is written into checkpoint 308.

In certain embodiments of the invention, if the queue entry associated with the smallest value is greater than the value of redo pointer 324, the value of redo pointer 324 is written into checkpoint 562.

In certain situations, all sorted buffer queues may become empty and therefore not contain any queue entries. When this occurs, in one embodiment of the invention, the value of redo pointer 324 is stored in the catalog file 570 as the current checkpoint value.

Advancing the Checkpoint Value Using a Single Buffer Queue

According to one embodiment, a database administrator specifies a preferred number of how many data blocks are to be read during the redo phase of recovery (a "target read value"). A higher specified target read value results in a longer redo phase of recovery when a failure occurs, but lower overhead during the steady state operation of the database to enforce the target read value. On the other hand, a lower target read value decreases time required for the redo phase of recovery, but imposes higher overhead during the steady state operation of the database as a greater number of disk writes are performed in writing changes in the buffers queues back to disk.

The database system employs techniques described hereafter to ensure that, if a failure were to occur, the target read value would be at least approximately accurate. In general, the target read value is enforced by repeatedly determining where the redo log checkpoint would have to be in order for the number of data blocks associated with redo entries above the checkpoint to approximately equal the target read value. The location thus determined is established to be the target checkpoint value.

Once the target checkpoint value is established, the current checkpoint value can be advanced by removing the queue entries that are associated with index values that are less than the target checkpoint value and writing the index value associated with the queue entry located at the head of sorted buffer queue as the checkpoint value.

Figure 6:
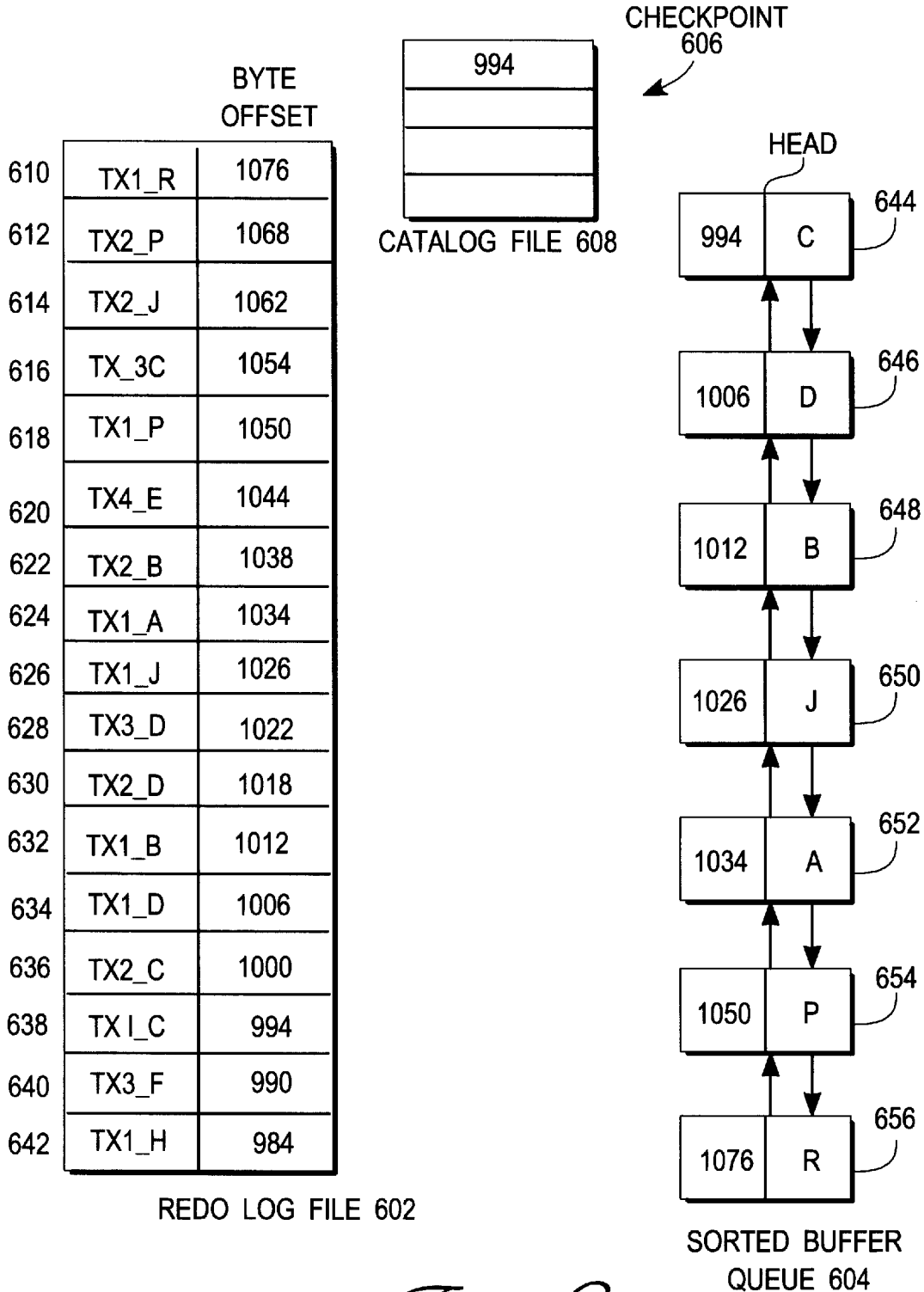
FIG. 6 illustrates a block diagram of a system in which the value of a checkpoint can be advanced based on a target checkpoint value in accordance with an embodiment of the invention

For example, FIG. 6 illustrates a block diagram of a system 600 in which the value of a checkpoint 606 can be advanced based on a target checkpoint value in accordance with an embodiment of the invention. As depicted, system 600 includes a redo log file 602, a sorted buffer queue 604 and a catalog file 608.

Redo log file 602 contains a plurality of redo records 610–642, which are associated with a byte offset that indicates the start of a particular redo record within the redo log file 602. Sorted buffer queue 604 contains a plurality of queue entries 644–656 which are linked together. The catalog file contains a checkpoint 606 which is currently equal to a byte offset value "994", which represents the start of redo record 638. Thus, only redo records 610–638 will need to be processed in the event of a database system failure. In addition, because redo records 610–638 contain change information for eight (8) different data blocks (C in redo records 638, 636 and 616), (D in redo records 634, 630, and 628), (B in redo records 632 and 622), (J in redo records 626 and 614 ), (A in redo record 624), (E in redo record 620), (P in redo records 618 and 612), and (R in redo record 610)), a total of eight (8) data blocks would be required to be read into volatile memory during the redo phase of recovery in the event of the database system failure.

For explanation purposes, it shall be assumed that in order to reduce the number of data blocks that would need to be read into volatile memory in the event of a database system failure, the value of the target checkpoint has been set equal to "1040". To advance the checkpoint 606 to be at least as great as the target checkpoint value of "1040", the queue entries that are associated with an index value that is less than "1040" are removed from sorted buffer queue 604. However, before a queue entry can be removed from the sorted buffer queue 604, the changes associated with the queue entry must first be written back to the database. Therefore, before a queue entry is removed from the sorted buffer queue, the changes associated with the queue entry are first written back to the database.

Figure 7:
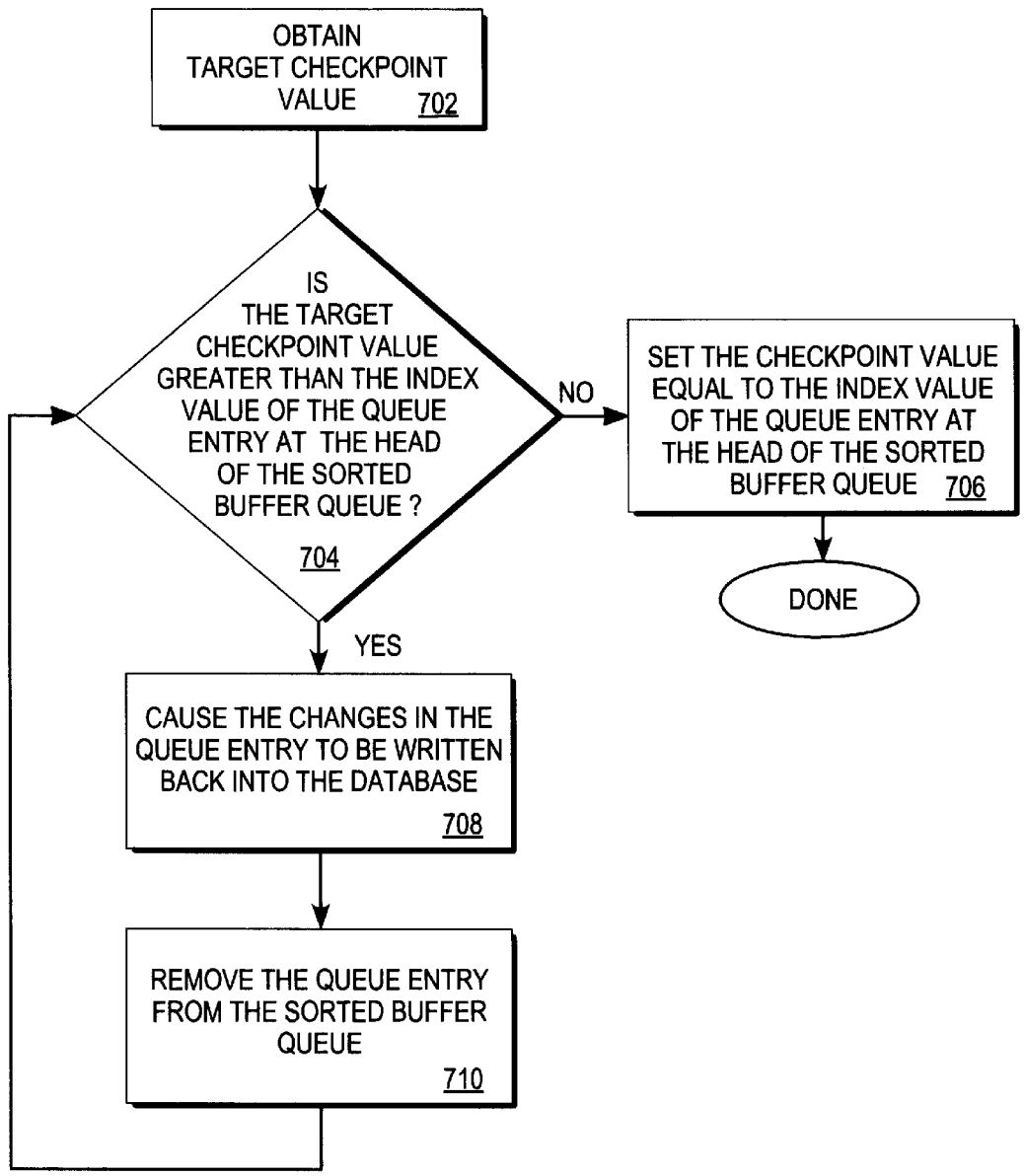
FIG. 7 is a flow diagram that illustrates the advancing of a checkpoint based on a target checkpoint value according to an embodiment of the invention

FIG. 7 is a flow diagram that illustrates the advancing of a checkpoint based on a target checkpoint value according to an embodiment of the invention.

At step 702, a target checkpoint value is obtained. As will be described below, the target checkpoint value may be selected using a variety of methods. For explanation purposes, it shall be assumed that a target checkpoint value of "1040" was obtained.

At step 704, it is determined whether the target checkpoint value is greater than the index value associated with the queue entry at the head of the sorted buffer queue. For example, the target checkpoint value "1040" is compared with the index value "994" of queue entry 644 of sorted buffer queue 604.

If at step 704 it is determined that the target checkpoint value is not greater than the index value associated with the queue entry at the head of the sorted buffer queue, then at step 706, the checkpoint 606 is set equal to the index value associated with the queue entry at the head of the sorted buffer queue.

However, if at step 704 it is determined that the target checkpoint value is greater than the index value associated with the queue entry at the head of the sorted buffer queue, then at step 708, the changes associated with the queue entry at the head of the sorted buffer queue are written back into the database. In certain embodiments, a Database Writer process (DBWR) is used to write the changes associated with the queue entry back into the database. The writing of queue entry information is described in detail below.

At step 710, the queue entry at the head of the sorted buffer queue is removed. The process of removing queue entries is described below. Control then proceeds to step 704 to determine whether the target checkpoint value is greater than the index value associated with the "new" queue entry that is now at the head of the sorted buffer queue.

In this example, based on a target checkpoint value of "1040", queue entries 644, 646, 648, 650 and 652 will be removed from the sorted buffer queue 604, as they all are associated with index values that are less than the target checkpoint value of "1040". Thus, after the queue entries 644, 646, 648, 650 and 652 are removed, the queue entry 654 will be a the head of sorted buffer queue 604 and the value of checkpoint 606 can be set equal to the index value associated with queue entry 654 ("1050"). Therefore, only redo records 610–618 will need to be processed if a database system failure occurred at this point in time. Consequently, because redo records 610–618 contain change information for four (4) different data blocks (C in redo record 616), (J in redo block 614), (P in redo blocks 618 and 612), and (R in redo block 610)), a total of four (4) data blocks would now be required to be read into volatile memory during the redo phase of recovery in the event of a database system failure.

Advancing the Checkpoint Value Using Multiple Sorted Buffer Queues

When multiple sorted buffer queues are used, the queue entries that are associated with index values that are less than the target checkpoint value are removed from each of the sorted buffer queues to advance the checkpoint. The minimum index value associated with all queue entries that are at the head of the sorted buffer queues is then selected for updating the checkpoint value. By selecting the index entry with the smallest value, all entries previously written in the redo log file are guaranteed to be reflected on the database. By writing the smallest index value into the checkpoint, the current checkpoint value can be advanced so that a limited number of data blocks will be required to be read into volatile memory during the redo phase of recovery in the event of a database system failure.

For example, referring to FIG. 5, the sorted buffer queues 504, 506 and 508 respectfully contain queue entries 516–520, 522–528 and 530–534. If a target checkpoint value of "1050" is selected, buffer entries 515–518, 522–524, and 530–532 will be respectfully removed from sorted buffer queues 504, 506 and 508. The checkpoint 562 is then advanced by setting it equal to the index value "1054" of queue entry 520 in sorted buffer queue 504. In certain embodiments, as queue entries are removed from the sorted buffer queues in order to advance to the checkpoint, checkpoint 562 is repeatedly incremented by continually writing the smallest index value that is associated with a queue entry that has moved to the head of a sorted buffer queue.

As stated above, it should be noted that the checkpoint value must never exceed the position of the last redo record that was written into redo log file 564. Therefore, before the value of the queue entry associated with the smallest value can be written into checkpoint 562, the value must first be compared with the value of redo pointer 324. If the queue entry associated with the smallest value is less than or equal to the value of redo pointer 324, then the queue entry associated with the smallest value is written into checkpoint 308.

In certain embodiments of the invention, if the queue entry associated with the smallest value is greater than the value of redo pointer 324, the value of redo pointer 324 is written into checkpoint 562.

As depicted in FIG. 5, by using multiple sorted buffer queues, concurrent processing within the database can be increased as sorted queues are more readily available for each process. By increasing the number of sorted queues, a process is less likely to have to wait to obtain a latch in order to insert a queue entry into a sorted buffer queue.

Using a Circular Queue For Determining Target Checkpoint Values

Figure 8:
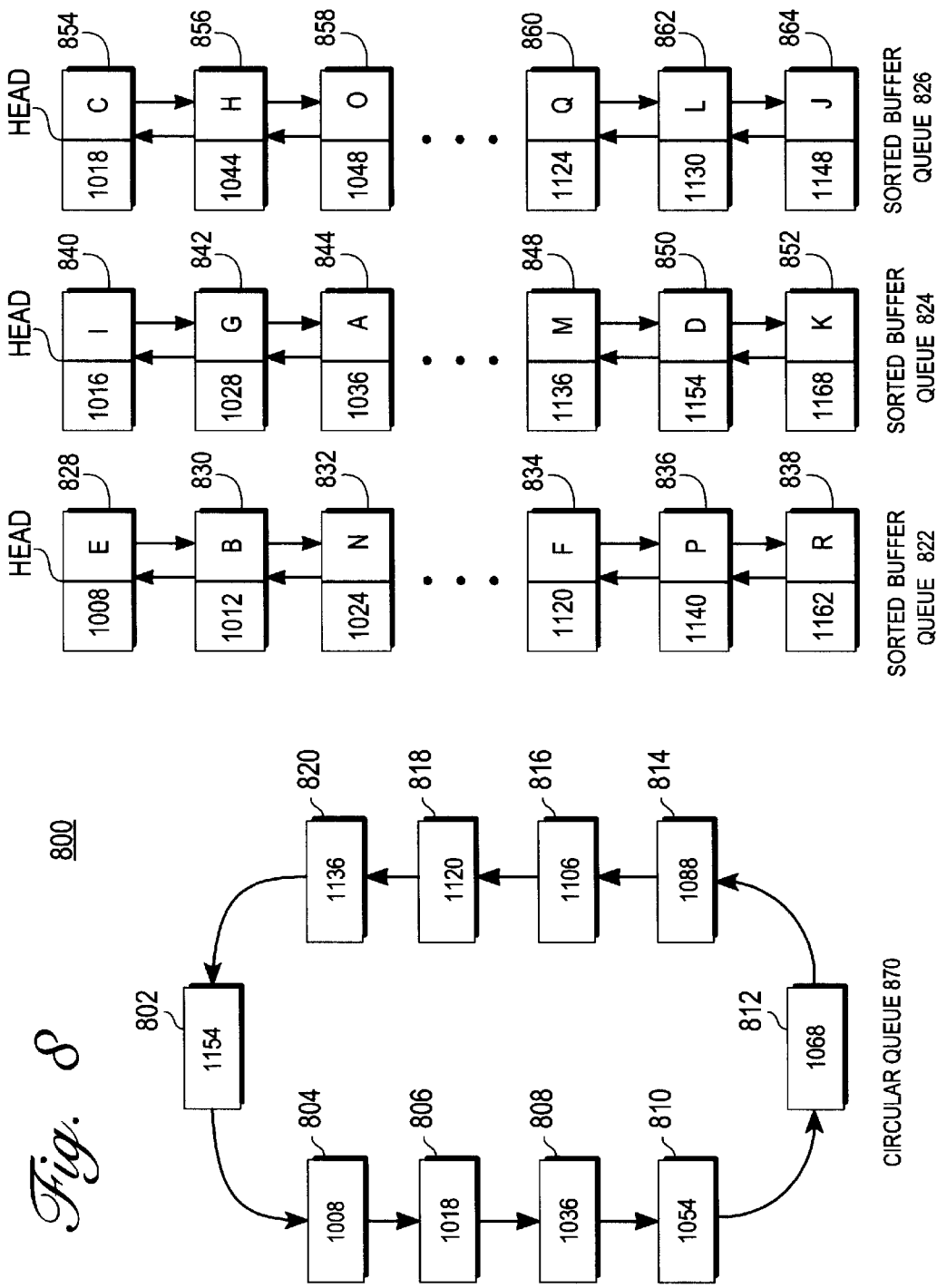
FIG. 8 illustrates a system in which a circular queue is used to determine target checkpoint values according to certain embodiments of the invention.

As previously stated, a variety of methods can be used for selecting and or determining target checkpoint values. FIG. 8 illustrates a system 800 in which a circular queue 870 is used to determine target checkpoint values according to certain embodiments of the invention. As depicted in FIG. 8, the circular queue 870 contains a plurality of offset buckets 802–820 which are used to store index values that are associated with queue entries in the plurality of sorted buffer queues 822, 824 and 826. By storing certain index values in the plurality of offset buckets 802–820 in a circular fashion, a target checkpoint can be determined such that the number of data blocks associated with redo records above the checkpoint matches the target read value.

In this example, a dirty buffer counter is used to count the number of the number of first dirties. A first dirty buffer is defined as the first time a data block is copied into a buffer in the buffer cache and modified by a transaction. Thus, copying a data block into a buffer in the buffer cache and modifying it three times before writing it back to the database only counts as a single first dirty. However, once a dirty buffer is written back into the corresponding data block in the database, it will be considered as another first dirty if the corresponding data block is again copied into a buffer in the buffer cache and modified by a transaction. Because buffers are only entered into a sorted buffer queue when a data block is first copied into a buffer and modified by a transaction, a first dirty corresponds to a queue entry being inserted into the buffer queues 822, 824 and 826. The dirty buffer counter is incremented whenever a queue entry is inserted into the buffer queue 822, 824 and 826.

The dirty buffer counter is used to determine which index values are to be copied into the offset buckets 802–820 in circular queue 870. A modulus operation is used to determine which index values are copied into the offset buckets 802–820 in the circular queue 870. For example, using a modulus of three (3), the index value associated with every third queue entry that is entered into one of the sorted buffer queues 822, 824 and 826 (i.e. every third dirty buffer), is copied into an offset bucket in the circular queue 870 in a circular fashion. Referring to FIG. 8, the use of a modulus of three (3) is illustrated for example by copying the index value "1008" in offset bucket 804, the index value "1018" in offset bucket 806, the index value "1036" in offset bucket 808, and so on.

Once the offset buckets 802–820 in circular queue 870 are filled, each time a new index value is to be written into an offset bucket, the target checkpoint value is updated to equal the value that is currently contained the offset bucket. For example, if offset bucket 804 is the next offset bucket to have an index value copied into it, and a queue entry having an index value of "1174" is added to one of the sorted buffer queues 822, 824 and 826, then the target checkpoint would be updated to equal "1008" and offset bucket 804 would be set equal to "1174". In this example, using a modulus of three and a circular queue size of ten (10), recovery downtime is controlled as a limit of approximately 30 data blocks will be required to be read in from the database in the event of a database system failure.

In certain embodiments, the system administrator can control the number of offset buckets that are used in the circular queue 870. One way of controlling the number of offset buckets is by changing the algorithm that is used in determining which index values are copied into the offset buckets in the circular queue 870. For example, the system administrator may choose to use a modulus of seven (7) instead of a modulus of three (3). This causes every seventh index value, instead of every third index value, to be copied into an offset bucket.

Using A Running Average For Determining Target Checkpoint Values

The target checkpoint value may alternatively be determined based on a desired number of data block reads (max_dirty_jarget) and running average of the number of blocks dirtied (i.e. first dirties) per "unit of redo". The max_dirty_jarget represents a desired bound on the number of data blocks that will be required to be read in the event of a database system failure. In certain embodiments, the max_dirty_target is a variable in which a user, such as a system administrator, can define.

A dirty buffer counter is used to count the number of queue entries that are inserted into the buffer queues. The dirty buffer counter is incremented whenever a queue entry is inserted into a buffer queue (i.e. a first dirty).

A unit of redo is defined as a fixed block of memory in the redo log file in which redo records can be stored. For example, if a redo log file contains 8 megabytes (MB) of redo records, and a unit of redo equals 2 MB, then the redo log file contains 4 units of redo.

The running average is used to estimate how many data block reads will be performed per block of redo in the event of a database system failure. Using the running average, a target checkpoint value can be determined based on the value of the max_dirty_target variable. Several methods can be used to calculate a running average.

For example, a running average can be determined using the following formula:

$$new\_average = old\_average * forget\_factor + new\_rate * (1 - forget\ factor).$$

The forget_factor is a number less than 1 and is used to determine the proportion contributed by the old average and the proportion contributed by the current rate in the calculation of the new running average. If the forget_factor for a single redo block is given by "F", then the forget_factor for N blocks is $F^N$. Thus, if N blocks of redo having "d" first dirties are written, the formula becomes:

$$new\_average = old\_average * F^N + d/N * (1 - F^N)$$

The forget_factor is can be dynamically changed. This is important for tuning, since the forget factor determines how sensitive the moving average is to the most recent rate. Since the moving average is used to determine how many buffers need to be written, a high sensitivity to the current rate implies that checkpoint buffer writing activity can fluctuate significantly in response to brief bursts of redo activity. On the other hand, a very low sensitivity may not make the checkpoint writing activity responsive enough to changes in the amount of first dirty activity.

In certain embodiments, a dynamic parameter average_dirties_half_life allows users to change the forget_factor. In one embodiment, the average_dirties_half_life parameter specifies the half life for a running average in bytes of redo. For example, if "h" is the value of the average_dirties_half_life parameter (in bytes of redo) and "r" is the size of a block of redo, then we can solve the equation $$0.5 = F^{h/r}$$

Knowing the values for h and r, the value of F can be solved. For example, letting h=2 MB and r=512 bytes, we have F=0.999831 (approximately). The default value for the average_dirties_half_life is 2 MB. Note that this value should be chosen carefully, since it can significantly influence the moving average computation.

The value of F has to be recomputed whenever the user changes the value of average_dirties_half_life or whenever a switch is made into a different redo log file which has a different redo block size (i.e. whenever either h or r changes).

To allow integer calculations, the value of F is stored as an integer number by multiplying the (fractional) value by a scale factor that is large enough to allow precise calculation, but small enough to avoid overflow in 4-byte variable computations. For each possible value of N, we compute and store the integer value of $F^N$ in an array that is used to compute the moving average each time a redo information is written into a redo log file.

Given the running average "A", and the value of max_dirty_target, it is possible to compute the position where the checkpoint should be advanced to (i.e. target checkpoint) in order to satisfy the availability requirements. The formula for computing the target checkpoint value is:

$$target\ checkpoint = max\_dirty\_target / A$$

For example, FIG. 9 illustrates a redo log file containing a plurality of records (906–924) and a next record 904 which are used to demonstrate how a target checkpoint value can be determined using a running average according to an embodiment of the invention. The next redo record 904 represents the location of next redo record in which changes by a particular transaction will be stored in the redo log file 902. The byte address "5000" associated with next redo record 904 represents the beginning of the next redo record 904 and the current head of redo log file 902.

In this example, it shall be assumed that a desired number of data block reads (i.e. max_dirty_jarget)=1400 was specified by a user when the current head of the redo log file 902 was at byte address 3688 (record 912). It is also assumed that 1312 blocks of redo have been generated (5000−3688= 1312) and that 1688 first dirty buffers occurred since the desired number of data blocks reads was specified. Thus, N=1312 blocks of redo and d=1688 first dirties. Assuming a forget_factor (F)=0.999831 and an old_average of =1, using the previously defined running average formula:

$$new\_average = old\_average * F^N + d/N * (1-F^N)$$

the following equation is produced:

$$new\_average = 1*0.999831^{1312} + 1688/1312 * (1-0.999831^{1312}) = \rightarrow new\_average = 1.056996604$$

The new target checkpoint is then calculated as follows:

$$new\ target\ checkpoint = max\_dirty\_target / new\ average = \rightarrow new\ target\ checkpoint = 1400/1.056996604 = 1324\ (approximately)$$

Therefore, in this example, the target checkpoint should be 1324 redo blocks behind the head of the redo log file 902. Hence, the target checkpoint is set equal to 3676, corresponding to record 916 (5000−1324=3676).

It should be noted that the above formula specifies a target checkpoint value as a byte offset within a single, ever-growing redo log file. However multiple redo log files may also be used in specifying a target checkpoint. In certain embodiments, the byte offset is composed of a triplet, specifying the redo log file ID, a block number within that redo log file, and a byte offset within the block. Therefore, the target checkpoint computed may need to be converted to account for the use of multiple redo log files in determining the target checkpoint value.

Maintaining a Running Count of Queue Entries in a Sorted Buffer Queue For Determining Target Checkpoint Values In certain embodiments, a running count of the number of queue entries that are contained in a sorted buffer queue is maintained. Based on this running count, a target checkpoint value is determined on a periodic basis. For example, referring to FIG. 6, sorted buffer queue 604 contains seven (7) queue entries. Each queue entry in sorted buffer queue 604 represents a dirty buffer, and therefore the length of sorted buffer queue 604 represent the number of dirty buffers in that are contained in the buffer cache. By keeping a track of the number of buffers that are added and removed from the sorted buffer queue, a running count of the number of queue entries that are contained in a sorted buffer queue 604 can be maintained. Thus, based on this running count of the number of queue entries and the max_dirty_target value, target checkpoint value can be determined for controlling the number of data block reads that are required after a database system failure.

For example, assume a max_dirty_jarget value equal to 5 and a circular queue having six (6) buckets. Each bucket is used to stored, in order, an index value of a queue entry (first dirty) in sorted buffer queue 604. Starting with the linking of queue entry 644, we would see the buckets updated as follows:

After queue entry 644 was linked

| 0 | 1 | 2 | 3 | 4 | 5 |
|---|---|---|---|---|---|
| 994 |   |   |   |   |   |
| ↑ |   |   |   |   |   |

After queue entry 646 was linked.

| 0 | 1 | 2 | 3 | 4 | 5 |
|---|---|---|---|---|---|
| 994 | 1006 |   |   |   |   |
|   | ↑ |   |   |   |   |

After queue entry 648 was linked.

| 0 | 1 | 2 | 3 | 4 | 5 |
|---|---|---|---|---|---|
| 994 | 1006 | 1012 |   |   |   |
|   |   | ↑ |   |   |   |

After queue entry 650 was linked.

| 0 | 1 | 2 | 3 | 4 | 5 |
|---|---|---|---|---|---|
| 994 | 1006 | 1012 | 1026 |   |   |
|   |   |   | ↑ |   |   |

After queue entry 652 was linked.

| 0 | 1 | 2 | 3 | 4 | 5 |
|---|---|---|---|---|---|
| 994 | 1006 | 1012 | 1026 | 1034 |   |
|   |   |   |   | ↑ |   |

Up to this point, we have not violated the limit of max_dirty_target, since only 5 queue entries have been inserted. However, as soon as we link in queue entry 645, we have exceeded the user-specified limit and therefore need to determine a new target checkpoint value in order to honor the user requirement of limiting data reads.

After queue entry 654 was linked.

| 0 | 1 | 2 | 3 | 4 | 5 |
|---|---|---|---|---|---|
| 994 | 1006 | 1012 | 1026 | 1034 | 1050 |

Target = 994

If we take the index value in the bucket which is logically 5 buckets behind the bucket we just inserted into, we would have the new target checkpoint position.

Therefore, after queue entry 654 is inserted, the new target checkpoint is value is contained in bucket 0 (994), since bucket 0 is 5 buckets "behind" the bucket we inserted into (bucket 5).

Thereafter, when we link queue entry 656, we need to wrap and reuse bucket 0. At this point, bucket 1 is 5 buckets "behind" bucket 0 and therefore contains the new target checkpoint position.

| 0 | 1 | 2 | 3 | 4 | 5 |
|---|---|---|---|---|---|
| 1076 | 1006 | 1012 | 1026 | 1034 | 1050 |

Target = 1006

If in this example we had had 6 buckets and a max_dirty_target equal to 20, a new index value would have been recorded in the "next" bucket each time four (4) new queue entries were added to the sorted buffer queue.

Controlling a Target Number of Queue Entries in a Sorted Buffer Queue

In certain embodiments, a queue length is maintained which represents the current number of queue entries that are contained in a sorted buffer queue. Using the queue length, a target number of queue entries is maintained in the sorted buffer queue. In certain embodiments, the target number of queue entries is provided as a max_entry_target variable that is used to control the number of queue entries that are maintained in the sorted buffer queue. If the queue length becomes greater than the max entry_target value, queue entries are removed from the sorted buffer queue until the queue length is no longer greater than the max_entry_target value. As previous stated, queue entries are only removed from the sorted buffer queue after the buffers associated with the queue entries have been written back to the database.

Referring to FIG. 6, sorted buffer queue 604 contains queue entries 644–656 and therefore has a queue length equal to (7). Each queue entry in sorted buffer queue 604 represents a dirty buffer, and therefore the queue length of sorted buffer queue 604 represents the number of dirty buffers that are contained in the buffer cache. Assuming a max_dirty_target value equal to (5), the change information in queue entries 644 and 646 will be written back to disk and queue entries 644 and 646 will be removed from sorted buffer queue 604. By writing and removing queue entries whenever the queue length becomes greater than the max_dirty_target value, a total number of queue entries can be maintained. Thus, by reducing the max_dirty_target value, the number of data blocks that will be required to be read after a database system failure can potentially be reduced.

It should be noted that although this example depicts a single sorted buffer queue, the invention is not limited to any particular number of sorted buffer queues. For example, referring to FIG. 5, a total queue length can be maintained for sorted buffer queues 540, 506 and 508. When the total buffer queue length becomes greater that the max_dirty_target value, queue entries are removed from the sorted buffer queues. In certain embodiments, priorities are set as to which sorted buffer queue the queue entries are to be removed.

Writing Queue Entry Information to the Database

According to one embodiment of the invention, a process (herein referred to as "DB Writer" or "DBWR") is responsible for writing buffers that contain updated data back to nonvolatile memory in order reflect the changes in the database. By writing information from the queue entries that are currently at the head of the sorted buffer queues, the queue entries at the head of the sorted buffer queue can be removed from the sorted buffer queue. Consequently, the next time a checkpoint value is stored, the new checkpoint value will be from an index entry that followed the index entry associated with the current checkpoint value, and therefore will effectively advance the checkpoint. In one embodiment of the present invention, DBWR continually writes back to the database buffers from queue entries that are nearest the head of the sorted buffer queue.

Removing Queue Entries From a Sorted Buffer Queue

Queue entries can be removed from anywhere in the sorted buffer queue. Thus, a queue entry is not required to be at the head of the sorted buffer queue before it can be removed. However, queue entries can only be removed from the sorted buffer queue after the buffers associated with the queue entries have been written back to the database.

In one embodiment of the invention, sorted buffer queue 318 is maintained as a doubly linked list of queue entries. Maintaining sorted buffer queue 318 as a doubly linked allows a queue entry to be easily removed from anywhere within the sorted buffer queue 318.

For example, referring to FIG. 3, if the information contained in queue entry 304 is written back to database 128, then queue entry 304 can be removed from sorted buffer queue 318 even though it is not at the head of the sorted buffer queue 318. This is accomplished by reconnecting the link 320 from queue entry 304 to queue entry 306 and reconnecting the link 322 from queue entry 304 to queue entry 302. However, removing queue entry 304 will not allow the checkpoint value to advance because only the index value associated with the queue entry at the head of the queue is stored as the checkpoint 308.

The number of queue entries in a sorted buffer queue 318 changes dynamically during the execution of the database system that maintains the sorted buffer queue 318. Generally, it is preferable to prevent the sorted buffer queue 318 from becoming too long. Therefore, flags may be used to control the process responsible for removing entries (the "removal process") in response to number of queue entries are contained within the sorted buffer queue 318.

In certain embodiments, flags are used by the removal process to determine the number of queue entries to be removed from the sorted buffer queue. For example, a half-full flag may be used to indicate if the number of entries on the sorted buffer queue is less than half the number of buffers in the buffer cache. If the half-full flag is not set, then the removal process does not remove entries from the sorted buffer queue 318. If the half-full flag is set, then the removal process removes entries from the sorted buffer queue 318.

In addition to the half-full flag, a full flag may be used to communicate to the removal process that queue entries need to be removed at a faster rate because the sorted buffer queue 318 is filled with more than a particular number of queue entries. There are various ways to increase the rate at which queue entries are removed. For example, the number of queue entries removed upon each invocation of the removal process may be increased. Instead of or in addition to increasing the number of queue entries removed upon each invocation, the rate at which the removal process executes may also be increased.

Depending on the status of the flags, the removal process attempts to remove a particular number of queue entries from the sorted buffer queue each time it is scheduled to execute. As stated above, queue entries can only be removed after their information has been written back to the database. Therefore, queue entries may be skipped and not removed if their information has not previously been written back to the database.

For example, if the removal process is scheduled to remove two queue entries from sorted buffer queue 318 and only the information contained in queue entry 304 has not yet been written back to database 128, then the removal process would remove queue entries 302 and 306. Therefore, after the removal process completed, queue entry 304 would be at the head of sorted buffer queue 318.

In certain situations, a process may attempt to update a queue entry as it is being removed from the sorted buffer queue. Therefore, in one embodiment of the invention, all updates to queue entries that are currently being removed from the sorted buffer queue are blocked until after the queue entry is removed. After the removal process is complete the update proceeds and the queue entry is inserted back into the sorted buffer queue as described above.

In an alternative embodiment of the invention, the update is allowed to continue and once the removal process completes a new index value is associated with the queue entry and the queue entry is re-linked by sorting it back into the tail of the sorted buffer queue based on the associated new index value.

Removing Queue Entries From Multiple Sorted Buffer Queues

When multiple sorted queues are used, the removal process must determine not only how many queue entries are to removed each time it is scheduled to execute but also, from which sorted buffer queues the queue entries should be removed. In one embodiment of the invention, each sorted buffer queue is associated with a half-full and full flag as described above. These flags are used in determining how many queue entries are to be removed from each of the sorted buffer queues each time the removal process is scheduled to execute.

In certain embodiments, the removal process attempts to remove a particular number of queue entries from each of the sorted buffer queues each time it is scheduled to execute. As stated above, queue entries can be removed before they are at the head of the sorted buffer queue. In addition, queue entries are not removed and may be skipped if their information has not been written back to the database.

For example, referring to FIG. 5, if the removal process is scheduled to remove two queue entries from each of the sorted buffer queues, (e.g. sorted buffer queues 504, 506 and 508), then queue entries 516, 518, 522, 524, 530 and 532 would be removed from their respective sorted buffer queue if the information contained in each queue entry has been previously written back to the database. After removing queue entries 516, 518, 522, 524, 530 and 532, queue entries 520, 526 and 534 would be at the head of sorted buffer queues 504, 506 and 508 respectively.

However, if the information in a particular queue entry that is to be removed from the list has not been previously written back to the database, then the queue entry is skipped and the next queue entry is tested for removal. For example, if the information contained in queue entry 524 was not previously written back to the database, then queue entry 524 would be skipped and queue entry 526 would be removed instead if its information was previously written back to the database. In this example, after the removal process completed, queue entries 520, 524 and 534 would be at the head of sorted buffer queues 504, 506 and 508 respectively.

Although the removal processes previously described are depicted as being separate from the process tasked with writing queue entry information back to the database, these processes may actually be one in the same. For example, a single process can be used to both write the information contained in a particular queue entry back to the database and then remove the particular queue entry from the queue.

Recovering After a Failure

In the event of a failure, the value of checkpoint 308 indicates a boundary within redo log file 118 between redo records that must be processed after the failure and redo records that do not have to be processed. Because the checkpoint value is continually advanced to provide a limit or bound on the number of data blocks that will need to be read in the event of a failure, recovery downtime can be controlled.

To recover from a failure, the recovery process reads the associated checkpoint value from the catalog file. Because all redo records that were stored in redo log file 118 prior to the checkpoint value are guaranteed to already be reflected on database 128, in one embodiment of the invention, the recovery process begins processing the redo records starting with the redo record at the byte offset equal to the checkpoint value. Therefore, the recovery process is only required to process only those redo records that are located at the byte offset values that are equal to, or greater than, the current checkpoint value. Thus, a bounded recovery time is achieved as a limited number of data blocks will be required to be read in the event of a database system failure.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for reducing overhead associated with recovering after a failure, the method comprising the steps of:

maintaining a checkpoint value that indicates which records of a plurality of records have to be processed after the failure, wherein the plurality of records indicate changes for a plurality of data blocks;

determining a target checkpoint value based on a desired number of data block reads that will be required during a redo phase of recovery; and writing changes from volatile memory to nonvolatile memory to advance the checkpoint value to at least the target checkpoint value.

2. The method of claim 1, further comprising performing the following steps after the failure:
   identifying the record associated with the checkpoint value;
   if a particular record was stored to nonvolatile memory before the record associated with the checkpoint value, then not processing the particular record; and
   if the particular record was not stored to nonvolatile memory before the record associated with the checkpoint value, then processing the particular record.

3. The method of claim 2, wherein the step of processing the particular record if the particular record was not stored to nonvolatile memory before the record associated with the checkpoint value further comprises the step of sequentially processing all records that follow a location indicated by the checkpoint value.

4. The method of claim 1, wherein the step of maintaining the checkpoint value includes the steps of:
   maintaining an ordered list of buffers, wherein buffers within said ordered list of buffers reside in volatile memory, wherein the ordered list of buffers has a head and a tail, the step of maintaining the ordered list including the steps of
      when an update is made to a data item within a buffer in volatile memory, performing the steps of
         writing a record that indicates the update to nonvolatile memory; and
         adding the buffer to the tail of the ordered list;
      when a data item contained in a buffer within the ordered list is stored in nonvolatile memory, removing the buffer from the ordered list; and
   writing to nonvolatile memory as said checkpoint value a value that identifies the record of said plurality of records that is associated with the buffer located at the head of the ordered list.

5. The method of claim 4, wherein the step of adding the buffer to the tail of the ordered list further comprises the step of sorting the buffer into the ordered list based on where the record associated with the buffer is stored in nonvolatile memory relative to where the records associated with the buffers that are already in the ordered list were stored in nonvolatile memory.

6. The method of claim 4, wherein the step of adding the buffer to the tail of the ordered list further comprises the step of adding the buffer to the tail of the ordered list only if the buffer does not already reside in the ordered list.

7. The method of claim 4, wherein the step of maintaining an ordered list of buffers further comprises the step of storing an index value with each buffer in the ordered list of buffers, wherein the index value indicates a storage location in nonvolatile memory of the record associated with the buffer.

8. The method of claim 7, wherein the step of writing changes from volatile memory to nonvolatile memory to advance the checkpoint value, includes the steps of:
   removing all buffers from the ordered list of buffers that have an index value which is less than the target checkpoint value; and
   writing to nonvolatile memory as said checkpoint value the index value that is associated with the buffer located at the head of the ordered list.

9. The method of claim 4, wherein the step of adding the buffer to the tail of the ordered list further comprises the steps of:
   obtaining an index value, wherein the index value corresponds to a storage location in nonvolatile memory;
   storing the index value as the index value for the buffer; and
   inserting the buffer into the ordered list based on the index value for the buffer.

10. The method of claim 9, wherein the step of determining the target checkpoint value comprises the steps of:
   maintaining a circular queue of offset buckets, wherein the offset buckets are used to store index values associated with buffers in the ordered list; and
   periodically setting the target checkpoint value equal to an index value that is contained in an offset bucket.

11. The method of claim 10, wherein the step of maintaining the circular queue of offset buckets, comprises the step of:
   repeatedly performing the steps of
      selecting an offset bucket; and
      storing an index value in the offset bucket.

12. The method of claim 9, wherein the step of determining the target checkpoint value comprises the steps of:
   calculating a maximum number of records that should be processed after the failure, wherein the maximum number of records is based on the desired number of data block reads that will be required during the redo phase of the recovery; and
   updating the target checkpoint value based on the maximum number of records.

13. The method of claim 12, wherein step of calculating the maximum number of records comprises the steps of maintaining a running average of first dirties per unit of redo.

14. The method of claim 4, wherein:
   each buffer is associated with an index value, wherein said index value identifies where the record associated with each buffer is written to nonvolatile memory;
   said step of adding the buffer to the tail of the ordered list includes the step of adding the buffer to the tail of one of a plurality of ordered lists;
   said step of writing to nonvolatile memory as said checkpoint value the value that identifies the record associated with the buffer located at the head of the ordered list includes the step of writing to nonvolatile memory the checkpoint value that identifies the record associated with a particular buffer located at the head of one of the plurality of ordered lists, wherein said particular buffer is associated with a smallest index value of all buffers located at the head of the one of the plurality of ordered lists; and
   said step of removing the buffer from the ordered list includes the step of removing the buffer from one of the plurality of ordered lists.

15. The method of claim 14, wherein the step of writing changes from volatile memory to nonvolatile memory to advance the checkpoint value, includes the steps of:
   removing all buffers from the plurality of ordered lists that have an index value which is less than the target checkpoint value; and
   writing to nonvolatile memory as said checkpoint value the index value that is associated with a particular buffer located at the head of one of the plurality of ordered lists, wherein said particular buffer is associated with a smallest index value of all buffers located at the head of the one of the plurality of ordered lists.

16. A system for reducing overhead associated with recovering after a failure, the system comprising:
   a memory;

one or more processors coupled to the memory; and a set of computer instructions contained in the memory, the set of computer instructions including computer instructions which when executed by the one or more processors, cause the one or more processors to perform the steps of:

maintaining a checkpoint value that indicates which records of a plurality of records have to be processed after the failure, wherein the plurality of records indicated changes for a plurality of data blocks;

determining a maximum number of buffers that are to be maintained in volatile memory, wherein the buffers are maintained in one or more ordered list of buffers; and removing buffers from the one or more ordered list of buffers when the number of buffers in the one or more ordered list of buffers exceeds the maximum number of buffers that are to be maintained in volatile memory.

17. A computer-readable medium carrying one or more sequences of instructions for reducing overhead associated with recovering after a failure, wherein execution of the one or more sequences of instructions by one or more processors causes the one or more processors to perform the steps of:

maintaining a checkpoint value that indicates which records of a plurality of records have to be processed after the failure, wherein the plurality of records indicate changes for a plurality of data blocks;

determining a target checkpoint value based on a desired number of data block reads that will be required during a redo phase of recovery; and writing changes from volatile memory to nonvolatile memory to advance the checkpoint value to at least the target checkpoint value.

18. The computer-readable medium of claim 17, further comprising instructions for performing the following steps after the failure:

identifying the record associated with the checkpoint value;

if a particular record was stored to nonvolatile memory before the record associated with the checkpoint value, then not processing the particular record; and if the particular record was not stored to nonvolatile memory before the record associated with the checkpoint value, then processing the particular record.

19. The computer-readable medium of claim 18, wherein the step of processing the particular record if the particular record was not stored to nonvolatile memory before the record associated with the checkpoint value further comprises the step of sequentially processing all records that follow a location indicated by the checkpoint value.

20. The computer-readable medium of claim 17, wherein the step of maintaining the checkpoint value includes the steps of:

maintaining an ordered list of buffers, wherein buffers within said ordered list of buffers reside in volatile memory, wherein the ordered list of buffers has a head and a tail, the step of maintaining the ordered list including the steps of when an update is made to a data item within a buffer in volatile memory, performing the steps of
writing a record that indicates the update to nonvolatile memory; and
adding the buffer to the tail of the ordered list;

when a data item contained in a buffer within the ordered list is stored in nonvolatile memory, removing the buffer from the ordered list; and writing to nonvolatile memory as said checkpoint value a value that identifies the record of said plurality of records that is associated with the buffer located at the head of the ordered list.

21. The computer-readable medium of claim 20, wherein the step of adding the buffer to the tail of the ordered list further comprises the step of sorting the buffer into the ordered list based on where the record associated with the buffer is stored in nonvolatile memory relative to where the records associated with the buffers that are already in the ordered list were stored in nonvolatile memory.

22. The computer-readable medium of claim 20, wherein the step of adding the buffer to the tail of the ordered list further comprises the step of adding the buffer to the tail of the ordered list only if the buffer does not already reside in the ordered list.

23. The computer-readable medium of claim 20, wherein the step of maintaining an ordered list of buffers further comprises the step of storing an index value with each buffer in the ordered list of buffers, wherein the index value indicates a storage location in nonvolatile memory of the record associated with the buffer.

24. The computer-readable medium of claim 23, wherein the step of writing changes from volatile memory to nonvolatile memory to advance the checkpoint value, includes the steps of:

removing all buffers from the ordered list of buffers that have an index value which is less than the target checkpoint value; and writing to nonvolatile memory as said checkpoint value the index value that is associated with the buffer located at the head of the ordered list.

25. The computer-readable medium of claim 20, wherein the step of adding the buffer to the tail of the ordered list further comprises the steps of:

obtaining an index value, wherein the index value corresponds to a storage location in nonvolatile memory;

storing the index value as the index value for the buffer; and inserting the buffer into the ordered list based on the index value for the buffer.

26. The computer-readable medium of claim 25, wherein the step of determining the target checkpoint value comprises the steps of:

maintaining a circular queue of offset buckets, wherein the offset buckets are used to store index values associated with buffers in the ordered list; and periodically setting the target checkpoint value equal to an index value that is contained in an offset bucket.

27. The computer-readable medium of claim 26, wherein the step of maintaining the circular queue of offset buckets, comprises the step of:

repeatedly performing the steps of
selecting an offset bucket; and
storing an index value in the offset bucket.

28. The computer-readable medium of claim 25, wherein the step of determining the target checkpoint value comprises the steps of:

calculating a maximum number of records that should be processed after the failure, wherein the maximum number of records is based on the desired number of data block reads that will be required during the redo phase of the recovery; and updating the target checkpoint value based on the maximum number of records.

29. The computer-readable medium of claim 28, wherein step of calculating the maximum number of records comprises the steps of maintaining a running average of first dirties per unit of redo.

30. The computer-readable medium of claim 20, wherein:
each buffer is associated with an index value, wherein said index value identifies where the record associated with each buffer is written to nonvolatile memory;
said step of adding the buffer to the tail of the ordered list includes the step of adding the buffer to the tail of one of a plurality of ordered lists;
said step of writing to nonvolatile memory as said checkpoint value the value that identifies the record associated with the buffer located at the head of the ordered list includes the step of writing to nonvolatile memory the checkpoint value that identifies the record associated with a particular buffer located at the head of one of the plurality of ordered lists, wherein said particular buffer is associated with a smallest index value of all buffers located at the head of the one of the plurality of ordered lists; and
said step of removing the buffer from the ordered list includes the step of removing the buffer from one of the plurality of ordered lists.

31. The computer-readable medium of claim 30, wherein the step of writing changes from volatile memory to nonvolatile memory to advance the checkpoint value, includes the steps of:
removing all buffers from the plurality of ordered lists that have an index value which is less than the target checkpoint value; and
writing to nonvolatile memory as said checkpoint value the index value that is associated with a particular buffer located at the head of one of the plurality of ordered lists, wherein said particular buffer is associated with a smallest index value of all buffers located at the head of the one of the plurality of ordered lists.

32. A system for reducing overhead associated with recovering after a failure, the system comprising:
a memory;
one or more processors coupled to the memory; and
a set of computer instructions contained in the memory, the set of computer instructions including computer instructions which when executed by the one or more processors, cause the one or more processors to perform the steps of:
maintaining a checkpoint value that indicates which records of a plurality of records have to be processed after the failure, wherein the plurality of records indicate changes for a plurality of data blocks;
determining a target checkpoint value based on a desired number of data block reads that will be required during a redo phase of recovery; and
writing changes from volatile memory to nonvolatile memory to advance the checkpoint value to at least the target checkpoint value.

33. The system of claim 32, further comprising performing the following steps after the failure:
identifying the record associated with the checkpoint value;
if a particular record was stored to nonvolatile memory before the record associated with the checkpoint value, then not processing the particular record; and
if the particular record was not stored to nonvolatile memory before the record associated with the checkpoint value, then processing the particular record.

34. The system of claim 32, wherein the step of maintaining the checkpoint value includes the steps of:
maintaining an ordered list of buffers, wherein buffers within said ordered list of buffers reside in volatile memory, wherein the ordered list of buffers has a head and a tail, the step of maintaining the ordered list including the steps of
when an update is made to a data item within a buffer in volatile memory, performing the steps of
writing a record that indicates the update to nonvolatile memory; and
adding the buffer to the tail of the ordered list;
when a data item contained in a buffer within the ordered list is stored in nonvolatile memory, removing the buffer from the ordered list; and
writing to nonvolatile memory as said checkpoint value a value that identifies the record of said plurality of records that is associated with the buffer located at the head of the ordered list.

35. The system of claim 34, wherein the step of maintaining an ordered list of buffers further comprises the step of storing an index value with each buffer in the ordered list of buffers, wherein the index value indicates a storage location in nonvolatile memory of the record associated with the buffer.

36. The system of claim 35, wherein the step of writing changes from volatile memory to nonvolatile memory to advance the checkpoint value, includes the steps of:
removing all buffers from the ordered list of buffers that have an index value which is less than the target checkpoint value; and
writing to nonvolatile memory as said checkpoint value the index value that is associated with the buffer located at the head of the ordered list.

37. The system of claim 34, wherein the step of adding the buffer to the tail of the ordered list further comprises the steps of:
obtaining an index value, wherein the index value corresponds to a storage location in nonvolatile memory;
storing the index value as the index value for the buffer; and
inserting the buffer into the ordered list based on the index value for the buffer.

38. The system of claim 37, wherein the step of determining the target checkpoint value comprises the steps of:
maintaining a circular queue of offset buckets, wherein the offset buckets are used to store index values associated with buffers in the ordered list; and
periodically setting the target checkpoint value equal to an index value that is contained in an offset bucket.

39. The system of claim 38, wherein the step of maintaining the circular queue of offset buckets, comprises the step of:
repeatedly performing the steps of
selecting an offset bucket; and
storing an index value in the offset bucket.

40. The system of claim 37, wherein the step of determining the target checkpoint value comprises the steps of:
calculating a maximum number of records that should be processed after the failure, wherein the maximum number of records is based on the desired number of data block reads that will be required during the redo phase of the recovery; and
updating the target checkpoint value based on the maximum number of records.

41. The system of claim 40, wherein step of calculating the maximum number of records comprises the steps of maintaining a running average of first dirties per unit of redo.

42. A method for reducing overhead associated with recovering after a failure, the method comprising the steps of:
   maintaining a checkpoint value that indicated which records of a plurality of records have to be processed after the failure, wherein the plurality of records indicate changes for a plurality of data blocks;
   determining a maximum number of buffers that are to be maintained in volatile memory, wherein the buffers that are to be maintained in one or more ordered list of buffers; and
   removing buffers from the one or more ordered list of buffers when the number of buffers in the one or more ordered list of buffers exceeds the maximum number of buffers that are to be maintained in volatile memory.

43. The method of claim 42, further comprising performing the following steps after the failure:
   identifying the record associated with the checkpoint value;
   if a particular record was stored to nonvolatile memory before the record associated with the checkpoint value, then not processing the particular record; and
   if the particular record was not stored to nonvolatile memory before the record associated with the checkpoint value, then processing the particular record.

44. The method of claim 43, wherein the step of processing the particular record if the particular record was not stored to nonvolatile memory before the record associated with the checkpoint value further comprises the step of sequentially processing all records that follow a location indicated by the checkpoint value.

45. The method of claim 42, wherein:
   each of the one or more ordered list of buffers has a head and a tail; and
   the one or more ordered list of buffers are maintained by performing the steps of
      when an update is made to a data item within a buffer in volatile memory, performing the steps of
         writing a record that indicated the update to nonvolatile memory; and
         adding the buffer to the tail of one of the one or more ordered list of buffers.

46. The method of claim 45, wherein the step of adding the buffer to the tail of one of the one or more ordered list of buffers further comprises the step of adding the buffer to the tail of one of the one or more ordered list of buffers only if the buffer does not already reside in the one or more ordered list of buffers.

47. The method of claim 45, wherein the step of maintaining the one or more ordered list of buffers further comprises the step of storing an index value with each buffer in said one or more ordered list of buffers, wherein the index value indicates a storage location in nonvolatile memory of the record associated with the buffer.

48. The method of claim 45, wherein the step of adding the buffer to the tail of one of the one or more ordered list of buffers further comprises the step of sorting the buffer into one of the one or more ordered list of buffers based on where the record associated with the buffer is stored in nonvolatile memory relative to where the records associated with the buffers that are already in the one or more ordered list of buffers have been stored in nonvolatile memory.

49. The method of claim 45, wherein the step of adding the buffer to the tail of one of the one or more ordered list of buffers further comprises the steps of:
   obtaining an index value, wherein the index value corresponds to a storage location in nonvolatile memory;
   storing the index value as the index value for the buffer; and
   inserting the buffer into one or more list of buffers based on the index value for the buffer.

50. A computer-readable medium carrying one or more sequences of instructions for reducing overhead associated with recovering after a failure, wherein execution of the one or more sequences of instructions by one or more processors causes the one or more processors to perform the steps of:
   maintaining a checkpoint value that indicates which records of a plurality of records have to be processed after the failure, wherein the plurality of records indicate changes for a plurality of data blocks;
   determining a maximum number of buffers that are to be maintained in volatile memory, wherein the buffers are maintained in one or more ordered list of buffers; and
   removing buffers from the one or more ordered list of buffers when the number of buffers in the one or more ordered list of buffers exceeds the maximum number of buffers that are to be maintained in volatile memory.

51. The computer-readable medium of claim 50, further comprising instructions for performing the following steps after the failure:
   identifying the record associated with the checkpoint value;
   if a particular record was stored to nonvolatile memory before the record associated with the checkpoint value, then not processing the particular record; and
   if the particular record was not stored to nonvolatile memory before the record associated with the checkpoint value, then processing the particular record.

52. The computer-readable medium of claim 51, wherein the step of processing the particular record if the particular record was not stored to nonvolatile memory before the record associated with the checkpoint value further comprises the step of sequentially processing all records that follow a location indicated by the checkpoint value.

53. The computer-readable medium of claim 50, further including instructions for performing the following steps:
   each of the one or more ordered lists of buffers has a head and a tail; and
   the one or more ordered list of buffers are maintained by performing the steps of
      when an update is made to a data item within a buffer in volatile memory, performing the steps of
         writing a record that indicated the update to nonvolatile memory; and
         adding the buffer to the tail of one of the one or more ordered list of buffers.

54. The computer-readable medium of claim 53, wherein the step of maintaining the one or more ordered list of buffers further comprises the step of storing an index value with each buffer in said one or more ordered list of buffers, wherein the index value indicates a storage location in nonvolatile memory of the record associated with the buffer.

55. The computer-readable medium of claim 53, wherein the step of adding the buffer to the tail of one of the one or more ordered list of buffers further comprises the step of sorting the buffer into one of the one or more ordered list of buffers based on where the record associated with the buffer is stored in nonvolatile memory relative to where the records associated with the buffers that are already in the one or more ordered list of buffers have been stored in nonvolatile memory.

56. The computer-readable medium of claim 53, wherein the step of adding the buffer to the tail of one or the one or more ordered list of buffers further comprises the steps of:

obtaining an index value, wherein the index value corresponds to a storage location in nonvolatile memory;

storing the index value as the index value for the buffer; and inserting the buffer into one or more ordered list of buffers based on the index value for the buffer.

57. The computer-readable medium of claim 53, wherein the step of adding the buffer to the tail of one of the one or more ordered list of buffers further comprises the step of adding the buffer to the tail of one of the one or more ordered list of buffers only if the buffer does not already reside in the one or or ordered list of buffers.

58. The system of claim 57, further including instructions for performing the following steps:

each of the one or more ordered list of buffers has a head and a tail; and the one or more ordered list of buffers are maintained by performing the steps of when an update is made to a data item within a buffer in volatile memory, performing the steps of writing a record that indicates the update to nonvolatile memory; and adding the buffer to the tail of one of the one or more ordered list of buffers.

59. The system of claim 58, wherein the step of maintaining the one or more ordered list of buffers further comprises the step of storing an index value with each buffer in said one or more ordered list of buffers, wherein the index value indicates a storage location in nonvolatile memory of the record associated with the buffer.

60. The system of claim 58, wherein the step of adding the buffer to the tail of one of the one or more ordered list of buffers further comprises the steps of:

obtaining an index value, wherein the index value corresponds to a storage location in nonvolatile memory;

storing the index value as the index value for the buffer; and inserting the buffer into one or more ordered list of buffers based on the index value for the buffer.

61. The system of claim 59, further comprising instructions for performing the following steps after the failure:

identifying the record associated with the checkpoint value;

if a particular record was stored to nonvolatile memory before the record associated with the checkpoint value, then not processing the particular record; and if the particular record was not stored to nonvolatile memory before the record associated with the checkpoint value, then processing the particular record.

* * * * *